US012750231B2

(12) United States Patent
Weiss

(10) Patent No.: US 12,750,231 B2
(45) Date of Patent: Sep. 29, 2026

(54) METHODS AND SYSTEMS FOR ENROLLMENT AND AUTHENTICATION

(71) Applicant: Golan Weiss, Moshav Hodaya (IL)

(72) Inventor: Golan Weiss, Moshav Hodaya (IL)

( * ) Notice: Subject to any disclaimer, the term of this patent is extended or adjusted under 35 U.S.C. 154(b) by 344 days.

(21) Appl. No.: 18/374,190

(22) Filed: Sep. 28, 2023

(65) Prior Publication Data

US 2024/0022419 A1 Jan. 18, 2024

Related U.S. Application Data

(63) Continuation-in-part of application No. 16/457,997, filed on Jun. 29, 2019, now Pat. No. 11,823,499, (Continued)

(51) Int. Cl.
*G06K 9/00* (2022.01)
*G06T 5/50* (2006.01)

(Continued)

(52) U.S. Cl.
CPC .............. *H04L 9/3231* (2013.01); *G06T 5/50* (2013.01); *G06V 10/24* (2022.01); *G06V 40/50* (2022.01); *G06T 2207/20221* (2013.01)

(58) Field of Classification Search
CPC . G06T 5/50; G06T 2207/20221; G06V 10/24; G06V 40/50; G06V 40/11; G06V 40/172; G06V 40/60
See application file for complete search history.

(56) References Cited

U.S. PATENT DOCUMENTS 4,896,363 A * 1/1990 Taylor ...................... G07C 9/37 382/125
6,836,554 B1 * 12/2004 Bolle ...................... G07C 9/37 902/4

(Continued)

FOREIGN PATENT DOCUMENTS

EP 2479707 A1 * 7/2012 ........... G06V 10/764
WO WO-2006098053 A1 * 9/2006 ........... G06V 40/166

OTHER PUBLICATIONS

Identity authentication using improved online signature verification method, Alisher Kholmatov et al., Elsevier, 2005, pp. 2400-2408 (Year: 2005).*

(Continued)

*Primary Examiner* — Jayesh A Patel
(74) *Attorney, Agent, or Firm* — Robert Brownstein

(57) ABSTRACT

Interactive based on said set steps of authentication methods for the recognition of a person. During authentication, a previously stored enrollment image is presented on a display to the person. A candidate person is instructed to present a reproduced image of the same scene and/or object to a camera while the person is holding the camera (mobile camera for example) unsupported in free space with respect to the scene or object. Alternatively, the user can hold the object unsupported in free space with respect the camera using the camera, a candidate image of the viewed scene or object is captured and presented with the previously stored enrollment image. The candidate person aligns the candidate image with the previously stored enrollment image. On alignment, the candidate image is verified as an authentic image of the person and the candidate person is authenticated as the person previously enrolled. The motivation of the invention is that once a person authenticates and the data alignment is accurate as in the registration. The needed CPU (Continued)

resources decreases dramatically and the level of authentication is increased in few magnitudes.

20 Claims, 21 Drawing Sheets

Related U.S. Application Data which is a continuation-in-part of application No. 15/310,769, filed on Nov. 13, 2016, now Pat. No. 10,339,403, which is a continuation-in-part of application No. 14/442,097, filed as application No. PCT/IB2013/060050 on Nov. 10, 2013, now Pat. No. 9,613,282.

(60) Provisional application No. 61/726,014, filed on Nov. 14, 2012.

(51) Int. Cl.

| | |
|---|---|
| ***G06V 10/24*** | (2022.01) |
| ***G06V 40/50*** | (2022.01) |
| ***H04L 9/32*** | (2006.01) |

(56) References Cited

U.S. PATENT DOCUMENTS

| | | | | |
|---|---|---|---|---|
| 9,613,282 | B2 * | 4/2017 | Weiss | G06V 30/142 |
| 10,339,403 | B2 * | 7/2019 | Weiss | G06F 21/45 |
| 11,823,499 | B2 * | 11/2023 | Weiss | G06V 40/1312 |
| 2004/0019570 | A1 * | 1/2004 | Bolle | G06V 40/168 705/64 |
| 2006/0136743 | A1 * | 6/2006 | Polcha | G07C 9/37 713/186 |
| 2009/0316963 | A1 * | 12/2009 | Boshra | G06V 40/1388 382/124 |
| 2010/0058483 | A1 * | 3/2010 | Haas | G06F 21/6254 726/27 |
| 2010/0303230 | A1 * | 12/2010 | Taveau | G06F 21/35 340/10.42 |
| 2012/0188055 | A1 * | 7/2012 | Sahin | H04L 67/10 340/5.82 |

OTHER PUBLICATIONS

Offline signature verification with generated training samples, B. Fang et al., IEEE, 2002, pp. 85-90 (Year: 2002).*

Personal authentication using hand images, Ajay Kumar et al., Elsevier, 2005, pp. 1478-1486 (Year: 2005).*

Automatic On-Line Signature Verification, Vishvjit S. Nalwa, IEEE, 1997, pp. 215-239 (Year: 1997).*

Visual Identification by Signature Tracking, Mario E. Munich et al., IEEE, 2003, pp. 200-217 (Year: 2003).*

ScreenPass: Secure Password Entry on Touchscreen Devices, Dongtao Liu et al., ACM, 2013, pp. 291-304 (Year: 2013).*

Towards Fraud-Proof ID documents using multiple data hiding technologies and biometrics, Justin Picard et al., SPIE, 2004, pp. 416-427 (Year: 2004).*

* cited by examiner

METHODS AND SYSTEMS FOR ENROLLMENT AND AUTHENTICATION

CROSS-REFERENCE TO RELATED APPLICATIONS

The present application is a continuation-in-part (CIP) of U.S. application Ser. No. 16/457,997, titled "Methods and Systems for Enrollment and Authentication", filed on Jun. 29, 2019, which is a continuation of U.S. application Ser. No. 15/310,769, filed on Nov. 12, 2016, which is a continuation of U.S. application Ser. No. 14/442,097, filed on May 11, 2015, is a national stage entry of PCT application No. PCT/IB2013/060050, filed on Nov. 10, 2013, which Claims priority from U.S. provisional application No. 61/726,014, filed on Nov. 13, 2012. Further U.S. application Ser. No. 15/310,769 also claims priority of PCT application No. PCT/IL2015/050510, filed on May 13, 2015, which claims priority from a provisional application No. 61/992,294, filed on May 12, 2014, the entire contents of which are incorporated herein by reference.

BACKGROUND

Technical Field

The field of the present disclosure relates to identity verification using methods of enrollment and authentication of a person based on a camera and a display.

Description of Related Art

Many resources have been invested into developing reliable schemes for identity verification in order to prevent fraud in electronic commerce. Existing methods for identity verification may rely on an item that the person possesses, such as a smart card or a datum that the person knows, such as a password, personal identification number (PIN) or other information.

Considerable effort has been invested in identity verification using biometrics, based on physiological and/or behavioral characteristics. Characteristics used for biometric authentication may include fingerprint, retina or iris scanning, voice, signature, and/or face.

U.S. Pat. No. 7,327,858 discloses biometric authentication using prominent lines of the hand when scanned by a scanning unit such as a scanner with a planar platen.

SUMMARY

Various computerized biometric methods for enrollment and authentication of a person are provided for herein. During authentication, a previously stored enrollment image is presented on a display to the person.

It is to be understood that the usage of the term body part in the present invention is by a way of example, and shall be replaced by a more generalized object definition including body part and other possibilities as defined later on.

A candidate person is instructed to present an object to a camera while the person is holding the object unsupported in free space with respect to the camera. Also, the user can capture, using a mobile camera, any stationary object/scene and then may be required to align the camera with the object. Using the camera, a candidate image of the object is captured and presented with the previously stored enrollment image. The candidate person aligns the candidate image with the previously stored enrollment image. On alignment, the candidate image is verified as an authentic image of the person and the candidate person is authenticated as the person previously enrolled. The previously stored enrollment image may be generated independently from the person. The same enrollment image may be displayed for the enrollment of multiple previously unenrolled persons.

During the enrollment, a person may hold an object unsupported in free space with respect to the camera. Alternatively, a person can hold the camera unsupported in free space with relation to the stationary scene/object. The camera may be used to capture the enrollment image of the object and background thereof. The authentication may include capturing the time series of the candidate images of the candidate object and background thereof.

During the capture, the time series of candidate images is presented on a display superimposed on the enrollment image with the respective backgrounds thereof.

The object may be a portion of an item such as a picture or document. The candidate person may align a feature of the object part in the candidate images with a corresponding feature in the enrollment image. The feature and the corresponding feature may be: a line, point, edge, unique visual trait, color or texture at certain region or any item with contrast that can be differentiated from the rest of the captured image of the object portion.

Verification may be performed by comparing the enrollment image with the authentication image. The alignment may include alignment in horizontal, vertical image coordinates, angular orientation in image space, and real space distance to camera.

Prior to presentation of the previously stored enrollment image, the enrollment image may be processed by performing horizontal mirror inversion of the enrollment image.

The candidate person may be instructed to align a feature of the object in the candidate images with a corresponding feature in the enrollment image. Upon the candidate person aligning the feature of the object in the candidate image with the corresponding feature in the enrollment image, one or more of the candidate images is verified as an authentic image of the candidate person. One or more candidate images may be authenticated thereby as an authentic image of the candidate person. The candidate person is then authenticated as the person previously enrolled by comparing the feature in the candidate image with the corresponding feature in the enrollment image. A pre-enrollment image of an object may be captured while the person is holding an object of the person unsupported in free space with respect to the camera. The pre-enrollment image may be presented to the person on a display. Upon presentation of the pre-enrollment image, the person may superimpose symbols with imaged features of the object as presented on the display. Upon superimposing the symbols with the imaged features of the object, the enrollment image is stored with the symbols and respective positions and orientations of the symbols in image space in the pre-enrollment image.

The symbols can be applied either from a predefined group of symbols such as keyboard stroke generated symbols or characters. Alternatively the symbols can be user defined such as user hand written symbols, shapes or any other symbol defined by the user.

During registration, the user can define and set a sequence of steps were each step consist of different/same symbols applying on screen with/out object capturing. The symbols detailed definition is referred to as one or more password symbols. The mentioned sequence steps can additionally be timed in such way that only the user can repeat the synchronized registered known by user sequence steps. The time synchronization shall be implemented by any indication of time progressing such as timer, progress bar, vibration or any other form of visual and audio indication of a measured length of time.

Another implementation can be any keyboard stroke for time interval were a visual symbol indicating the length of press by the user, including the gap between step sequence as defined herein.

Step sequence as defined herein is eligible only if the user can reproduce or synchronize the same step sequence in the authentication phase as in the registration. The current invention describes on screen hints to help the user reproduce the same registration step in the authentication phase.

Prior to the superimposition, the symbols may be relocated, re-sized and/or rotated. The presentation on the display to the candidate person of the enrollment image may include the stored symbols and at least a portion of an image of the object. Alternatively, the presentation on the display to the candidate person of the enrollment image may include presentation of the stored symbols without any portion of an image of the object. Multiple previously defined enrollment scales may be presented on a display to the person. The person may select one or more of the scales presented on the display to produce thereby a selected enrollment scale. The person may superimpose and/or reposition one of the enrollment images with the selected scale. The selected scale may be stored as an enrollment image. The authentication includes presentation on a display of the time series of the candidate images superimposed on the selected enrollment scale The candidate person may align the candidate images with the selected enrollment scale. During the authentication, the presentation of the enrollment scale to the person may include multiple enrollment scales and the candidate person may select person the selected enrollment scale. Various mobile computer systems are provided herein enabled to perform the computerized biometric methods as disclosed herein, wherein the camera and the display are parts of the mobile computer system. Various computer readable media are provided for herein encoded with processing instructions for causing a processor to execute the methods disclosed herein. The foregoing and/or other aspects will become apparent from the following detailed description when considered in conjunction with the accompanying drawing figures.

BRIEF DESCRIPTION OF THE DRAWINGS

The invention is herein described, in a non-limiting manner, by way of example only, with reference to the accompanying drawings, wherein.

FIG. II shows a method of the invention.

Figure 12:
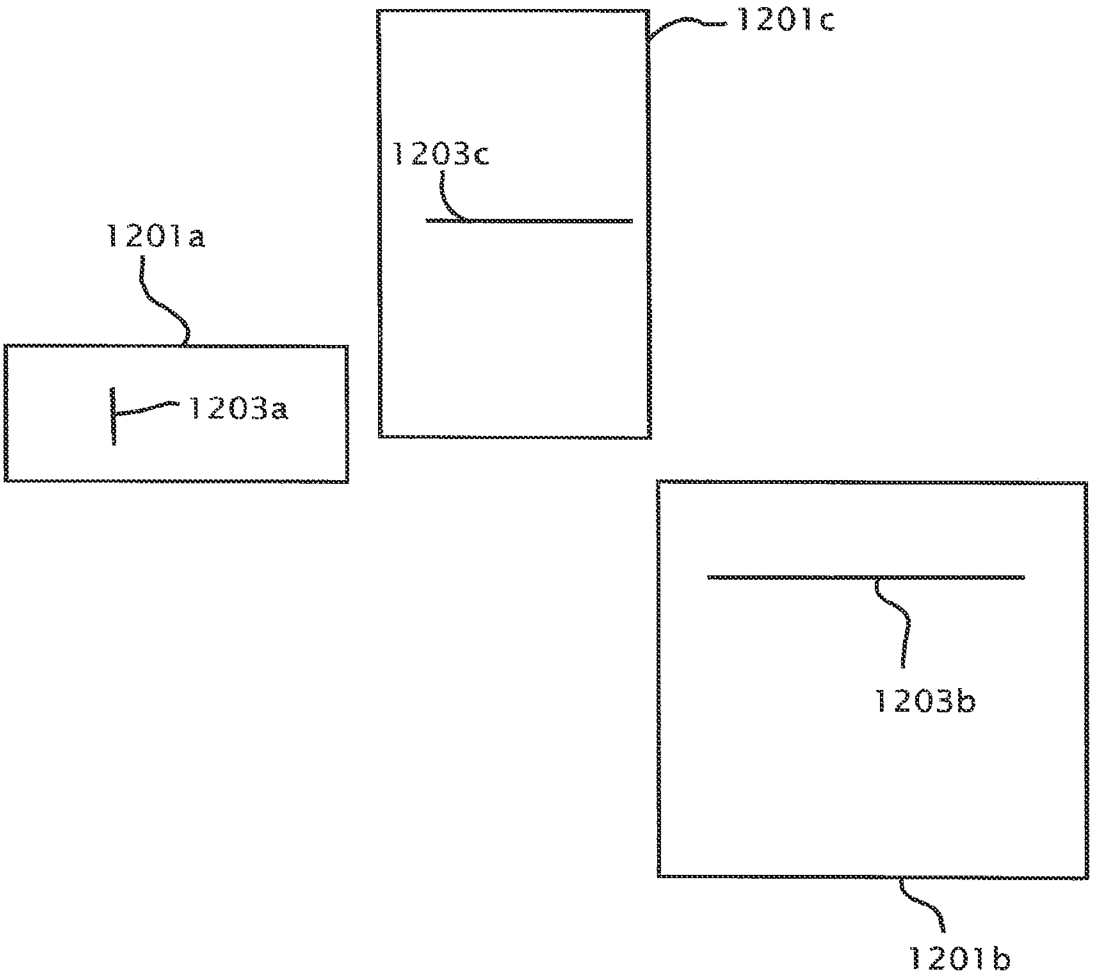

FIG. 12 shows an illustration of scaled symbols presented on screen, according to the method illustrated in FIG. I1.

Figure 13:
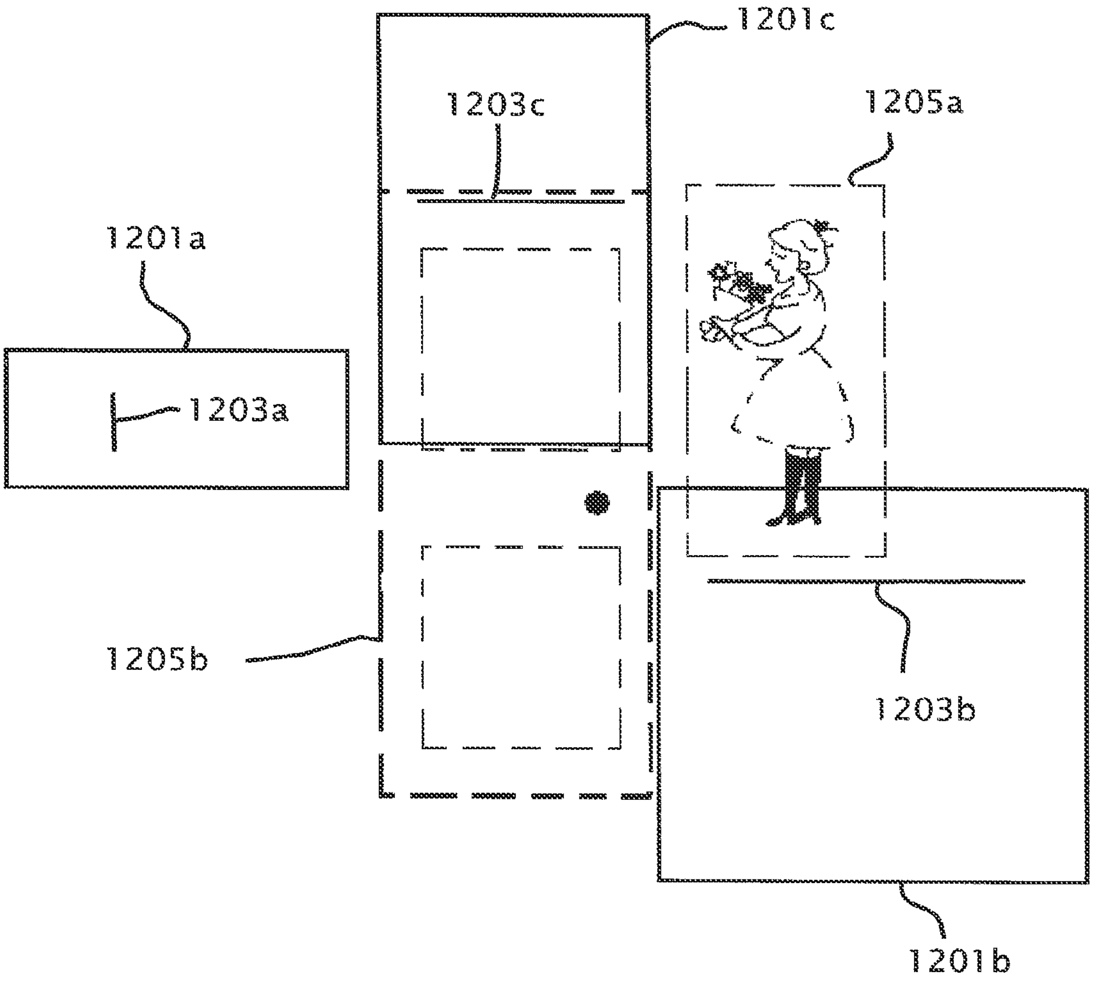
Figure 14:
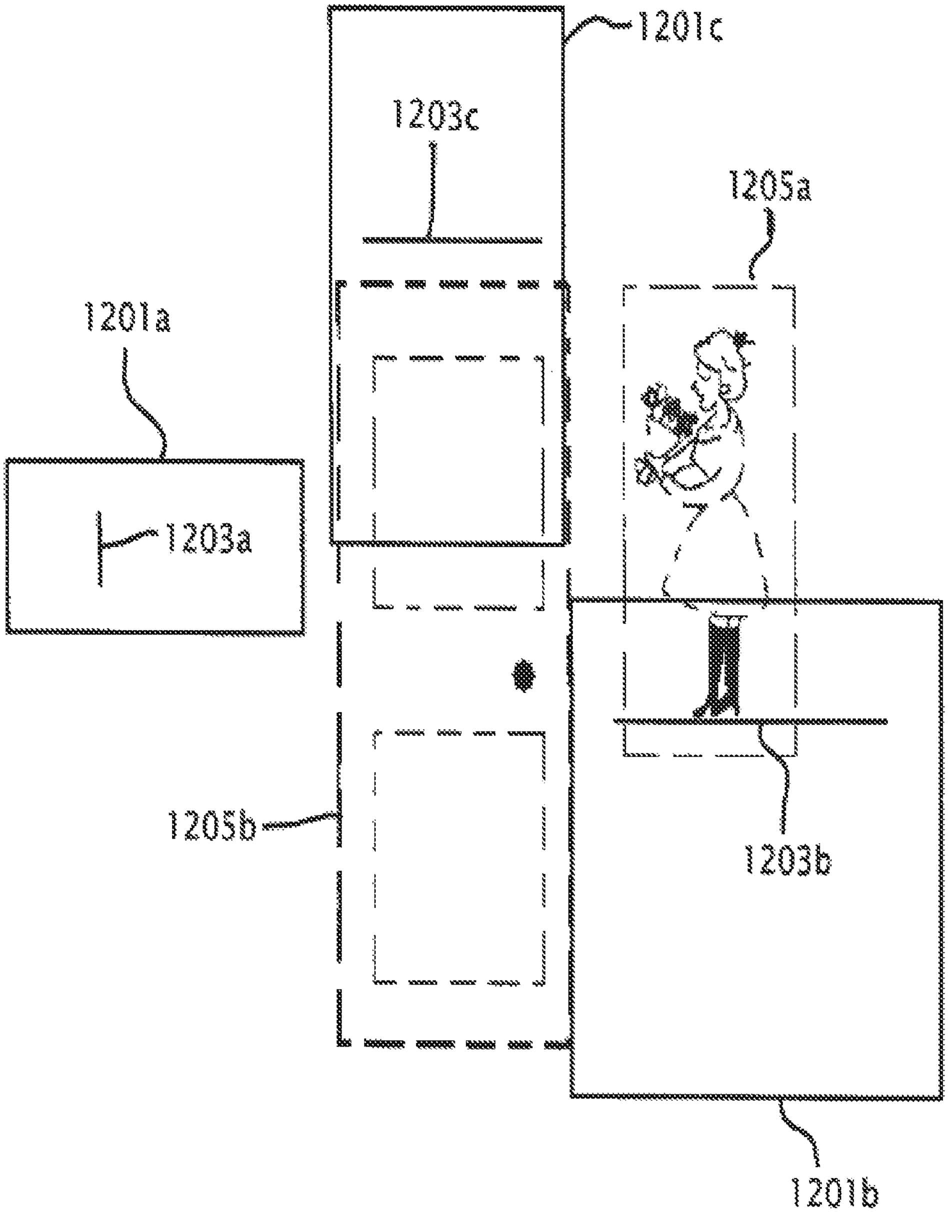

FIGS. 13 and 14 show an illustration of possible user superimposing of an object with said scaled symbols of FIG. 12 according to the method illustrated in FIG. II.

Figure 15:
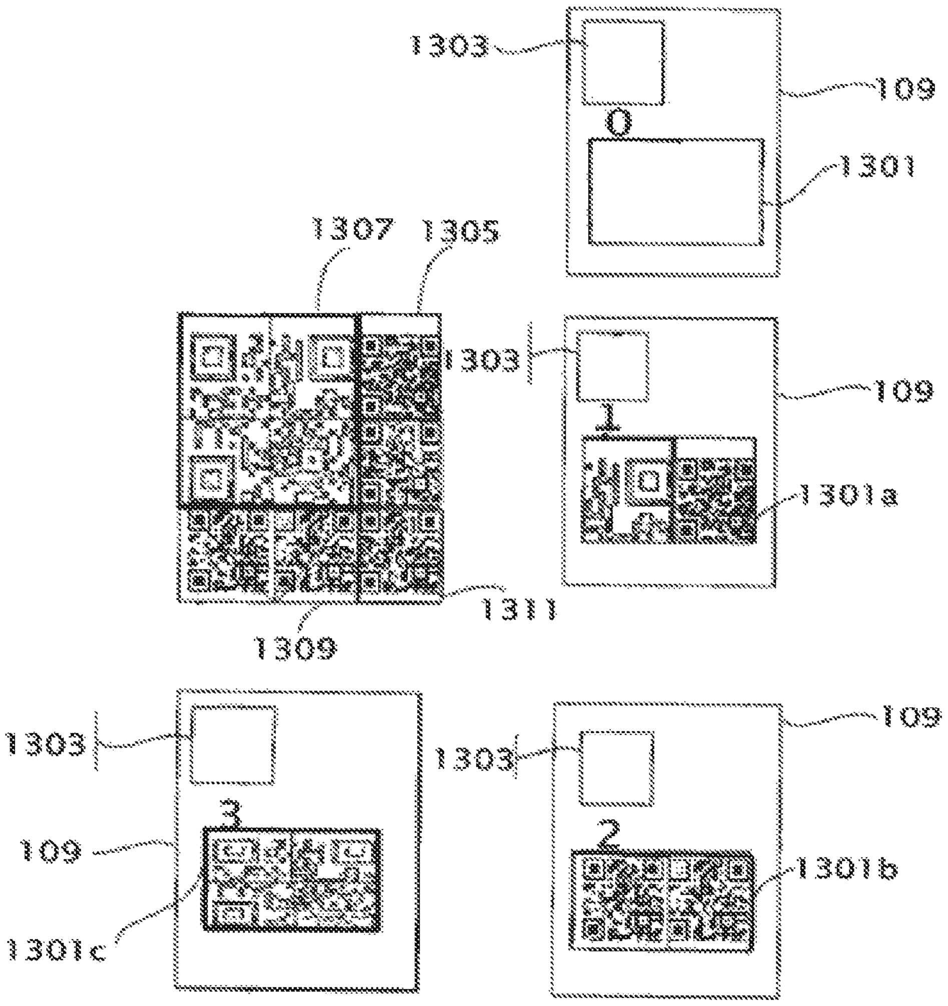

FIG. 15 shows a set of QR codes used in an embodiment of the invention, illustrating the positioning of the graticule line.

Figure 5:
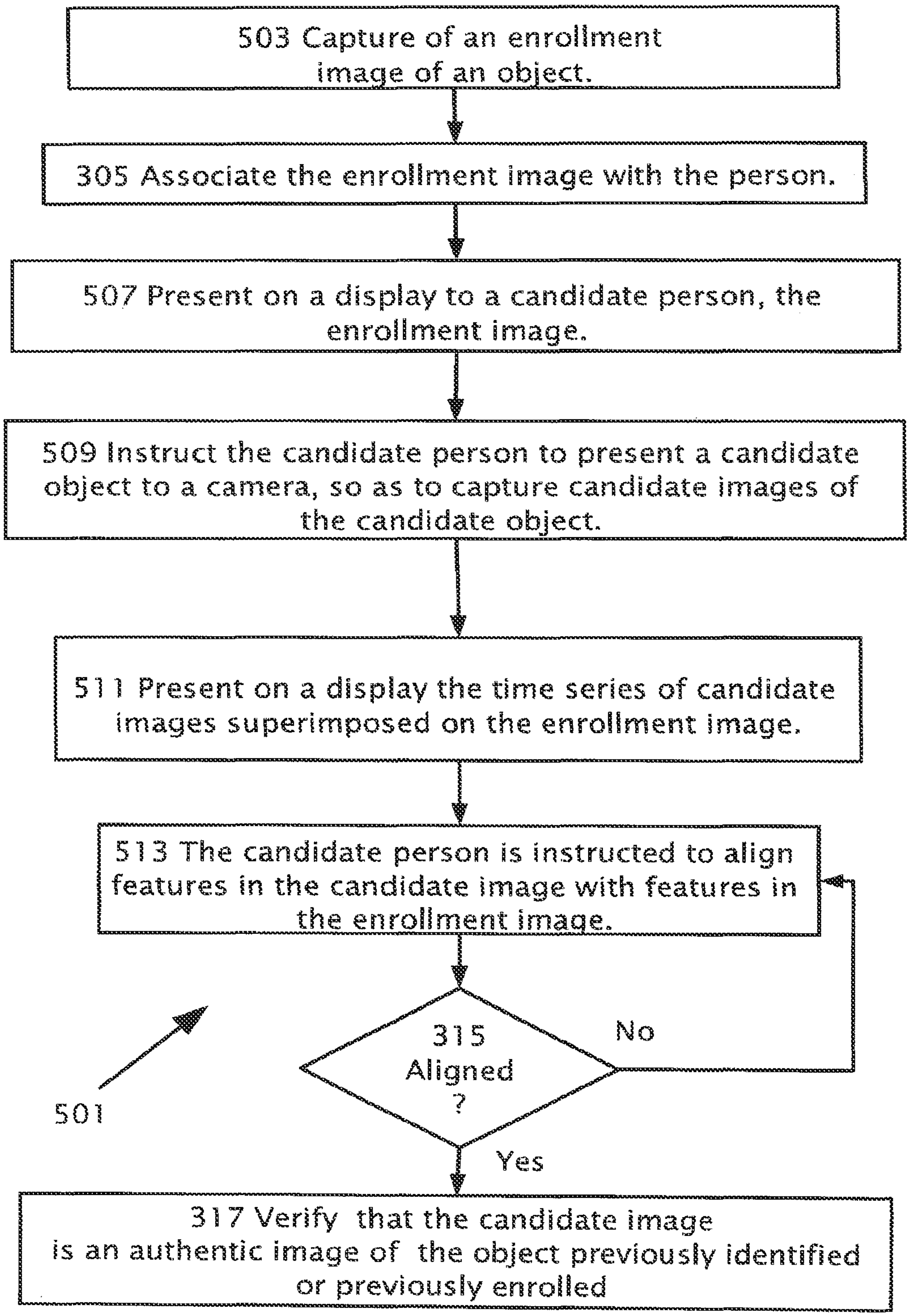
FIG. 5 illustrate another method of biometric enrollment and authentication, according to a feature of the present invention.
Figure 9:
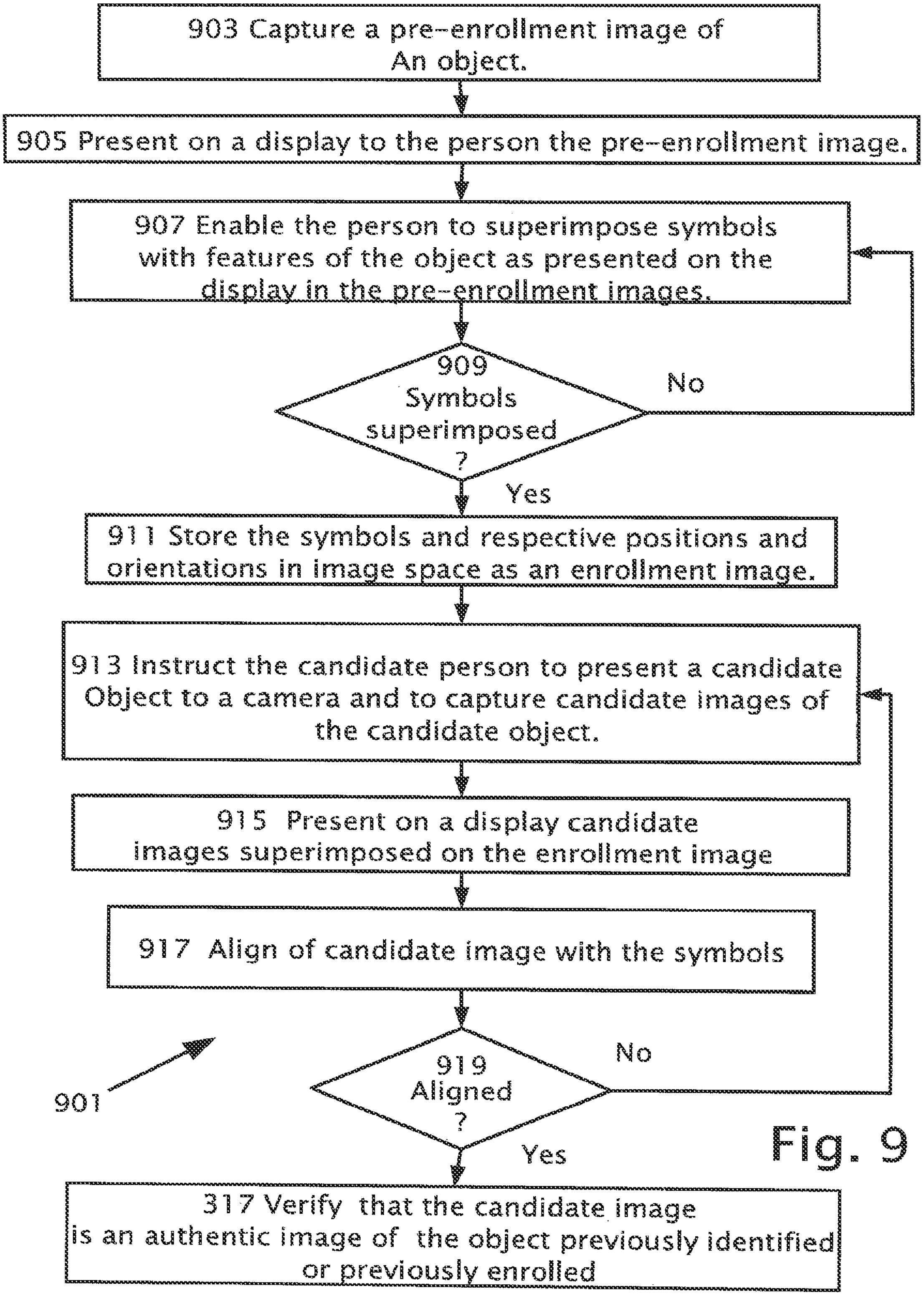
FIG. 9 and FIGS. 10*a,b* shows a flow diagram of a method and enrollment images respectively, according to different features of the present invention.
Figure 16:
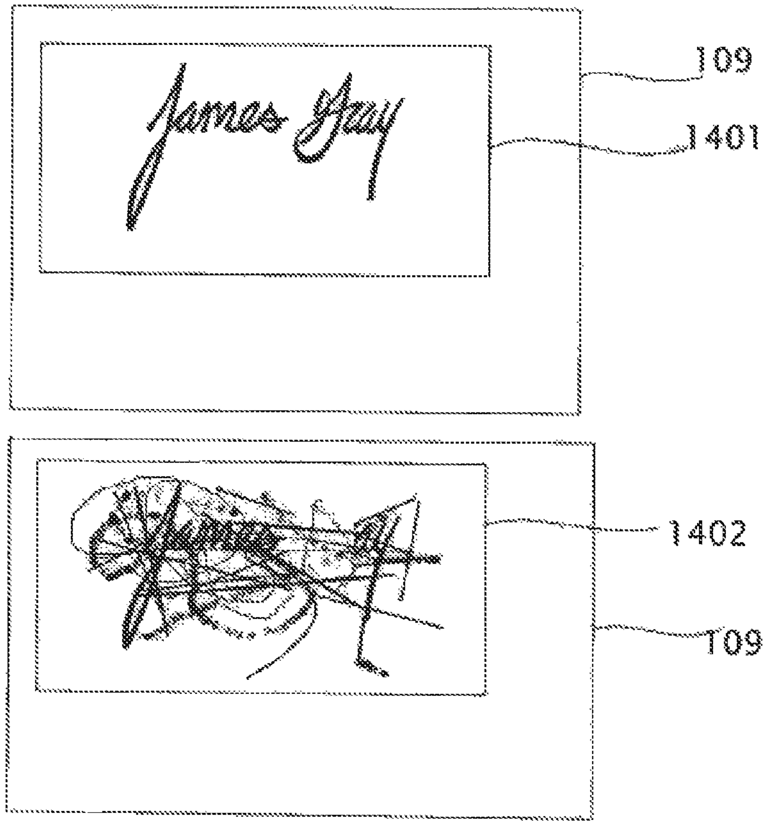

FIG. 16 show examples of an enrollment and authentication methods using said set timed sequence of step/s, according to the method illustrated in FIGS. 5 and 9.

Figure 17:
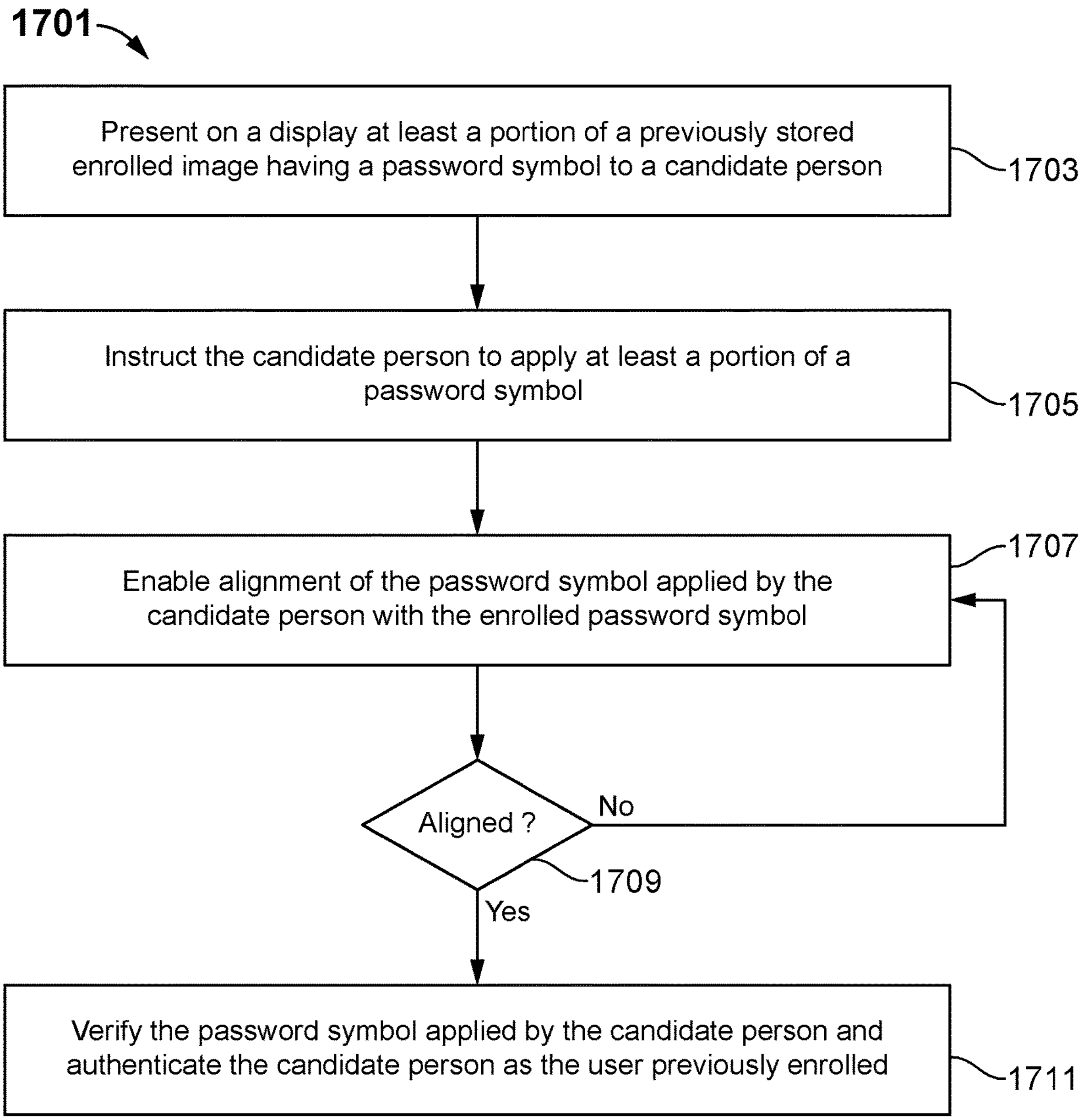

FIG. 17 shows a flowchart of an enrollment and authentication method, according to another embodiment of the present invention.

Figure 18:
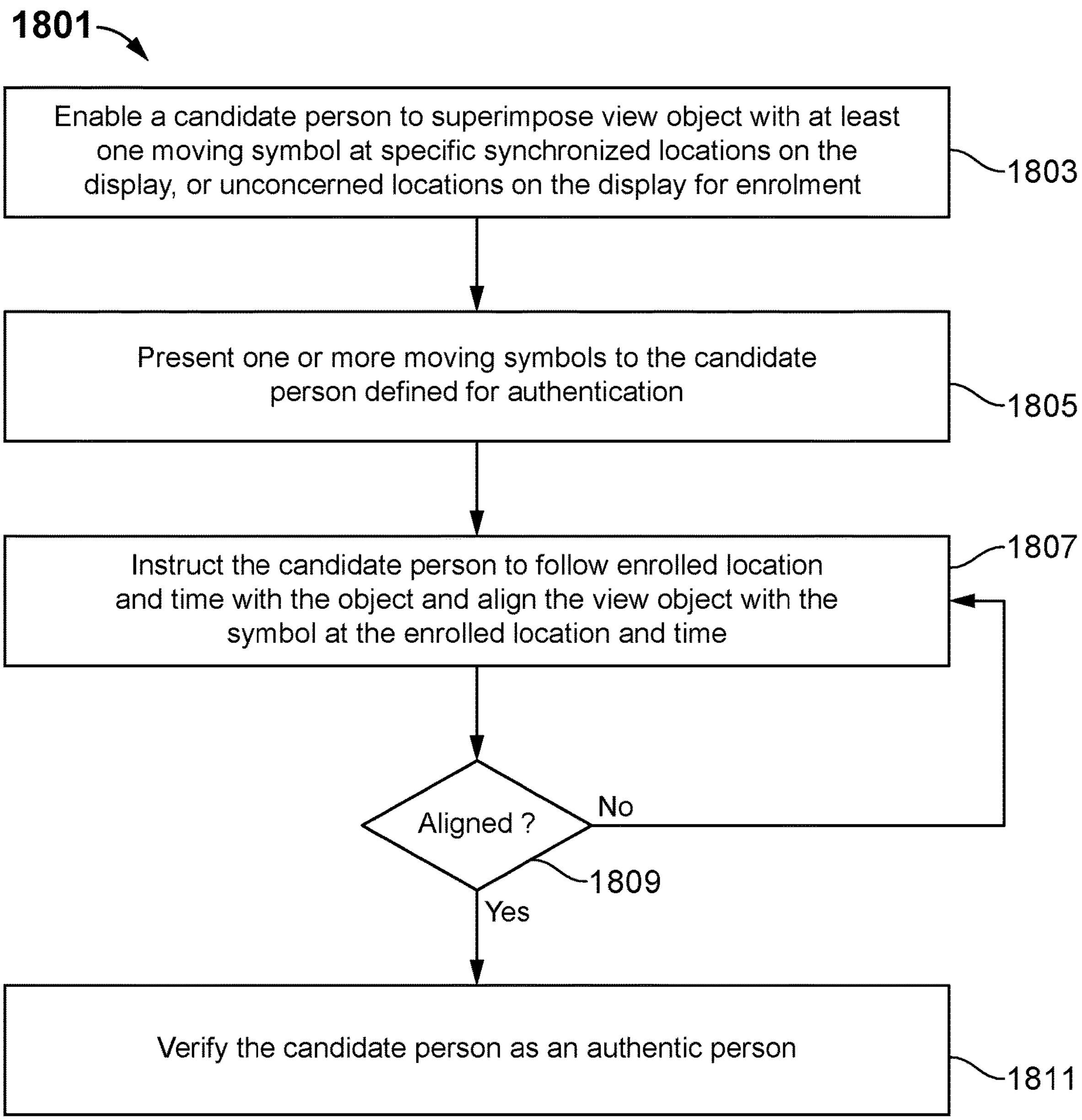

FIG. 18 shows a flowchart of an enrollment and authentication method, according to yet another embodiment of the present invention.

The foregoing and/or other aspects will become apparent from the following detailed description when considered in conjunction with the accompanying drawing figures.

DETAILED DESCRIPTION

Reference will now be made in detail to embodiments of the present invention, examples of which are illustrated in the accompanying drawings, wherein like reference numerals refer to the like elements throughout. The embodiments are described below to explain the present invention by referring to the figures. The term "registration" as used herein refers to spatial alignment of image features of different images captured at different places and/or times of similar or identical objects in different image frames.

The term "identification" as used herein refers to receiving initial information, name, identity card number or other information useful for uniquely identifying the user which a user presents prior or during enrollment. The term "enroll" or "enrollment" as used herein refers to an initiation of a user in the biometric system during which biometric information is received and stored for later identity verification or authentication. The term "enrollment image" refers to image capture during enrollment The term "authentication" as used herein refers to a biometric verification that the user is who he/she is claimed himself/herself to be during identification.

The term "verification" as used hereinafter refers to authentication or denial of authentication based on biometric image features of the candidate person as one of the previously enrolled persons or the previously identified person. The term "superimpose" as used herein in the context of presenting two or more images simultaneously on a display includes either (i) combining two or more images using image processing techniques and presenting the combined image and/or (ii) presenting to the user alternatively two or more images so that the appearance to the user is that of a combined superimposed image. The term "body part" as used herein for use in biometric enrollment and authentication may includes: a hand, an eye, an ear, a nose or a facial profile or portions thereof of the person.

The term "password symbol" may be combined of any of the following: signature, image, any shape, character, any combination of connected dots or pixels and any other form of symbol that may be used for identification. Hand written symbols upon authentication will be authenticated as biometric signature as known to the one skilled in the art of image processing and biometrics.

The term "region of interest" as used herein refers to any portion of the enrollment image selected and marked on screen by the user during registration. Upon authentication of the object the region of interest portion must be correlated independently of the whole image of the object. The correlation process is known to the one skilled in the art of image processing.

The articles "a", "an" is used herein, such as "a candidate image", an enrollment Image", "a background" have the meaning of "one or more" that is "one or more candidate images", 'one or more enrollment images" and "one or more backgrounds".

The term "object" as defined herein relates to anything that can be photographed. Object, in more details as defined herein comprises of anything that can be captured by camera, anything that can be combined of tangible objects (a portion of a room, building etc), movable items such as body part as defined above, a photograph, a drawing, a graphic object, document, 3D object, barcode, QR code or any other form of visual code, picture, card of any kind or any combination of the like. Furthermore the term "object" relates to visually reproducible scene that is and that can be captured during registration and repeatedly superimposed upon screen partial/distorted image with the candidate image of the same object and/or scene.

The object should contain sufficient contrast, edges and should be reproducible so that the authentication phase can succeed.

By way of introduction, different embodiments of the present invention may find use in a number of different biometric methods to identify and enroll a user in the system and subsequently authenticate a candidate person as one of the previously enrolled users. Embodiments of the present invention are intended to be used with a camera and a two dimensional or three dimensional display as may be available in a mobile computer system, e.g. smart-phone. In some embodiments of the present invention, the user during enrollment presents unsupported in free space an object, e.g. hand, and an enrollment image is captured. Subsequently, the person when for instance he/she desires to perform an Internet transaction, for example, presents the same object, e.g. hand, and an authentication image is captured also with the hand unsupported with free space between the camera and hand. The authentication image may be processed to be of the same hand as used for the enrollment image and authentication is achieved, or otherwise authentication is denied.

When an enrollment image is used again for authentication, the enrollment image when presented for authentication purposes may be blurred, manipulated in gray scale or color, resolution reduced, partially displayed or otherwise image processed, to render it difficult for an imposter to reconstruct an authentication image from the enrollment image when presented during authentication.

In various embodiments of the present invention to be presented in further detail, authentication may be in a different location and/or time or date or using a different computer system from enrollment, and any object may suitable for biometric enrollment and authentication.

The processing for authentication and verification of identity may be similar to the processing techniques disclosed in U.S. Pat. No. 7,327,858 such as by comparing specific features between the enrollment and authentication images. The features used in U.S. Pat. No. 7,327,858 are the prominent lines of the hand. However, according to prior art methods, before the actual authentication processing may be performed, image registration is performed during which the respective images of the same features of interest are located in both the enrollment image and authentication image. Various embodiments of the present invention are intended to avoid or facilitate image registration between the common imaged features of interest in the enrollment image and in the authentication. Avoiding or facilitating image registration to reduce the computational burden on the processor being used and/or decrease computational time demands. Thus there is a need for and it would be advantageous to have methods and systems useful for avoiding and/or facilitating image registration between enrollment images and authentication images to enable authentication of using image capture of unsupported objects held in free space, or mobile camera device held unsupported with relation to the object. Although in some embodiments of the present invention a mobile computer system is used for enrollment and authentication, in other embodiments a non-mobile computer system and otherwise a dedicated computer system may also or alternatively be used.

The process of registration and authentication as described herein shall be combined from a set of above mentioned sequence steps. Sequence steps as presented here are steps of which a user must follow in the same order and/or time synchronizations. These sequence steps can be comprised of on screen superimposed candidate images of the same object or view. Furthermore, these sequence steps can be any combination of symbols on screen placement, drawing, keyboard stroke or any other combination of the like.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. I illustrates a simplified block diagram of a mobile computer system 100 according to features of the present invention. Mobile computer system 100 is connectible over a network 106 to a server 108. Mobile computer system 100 is also connectible through a cellular base station transceiver 119 to cellular network

Figure 2:
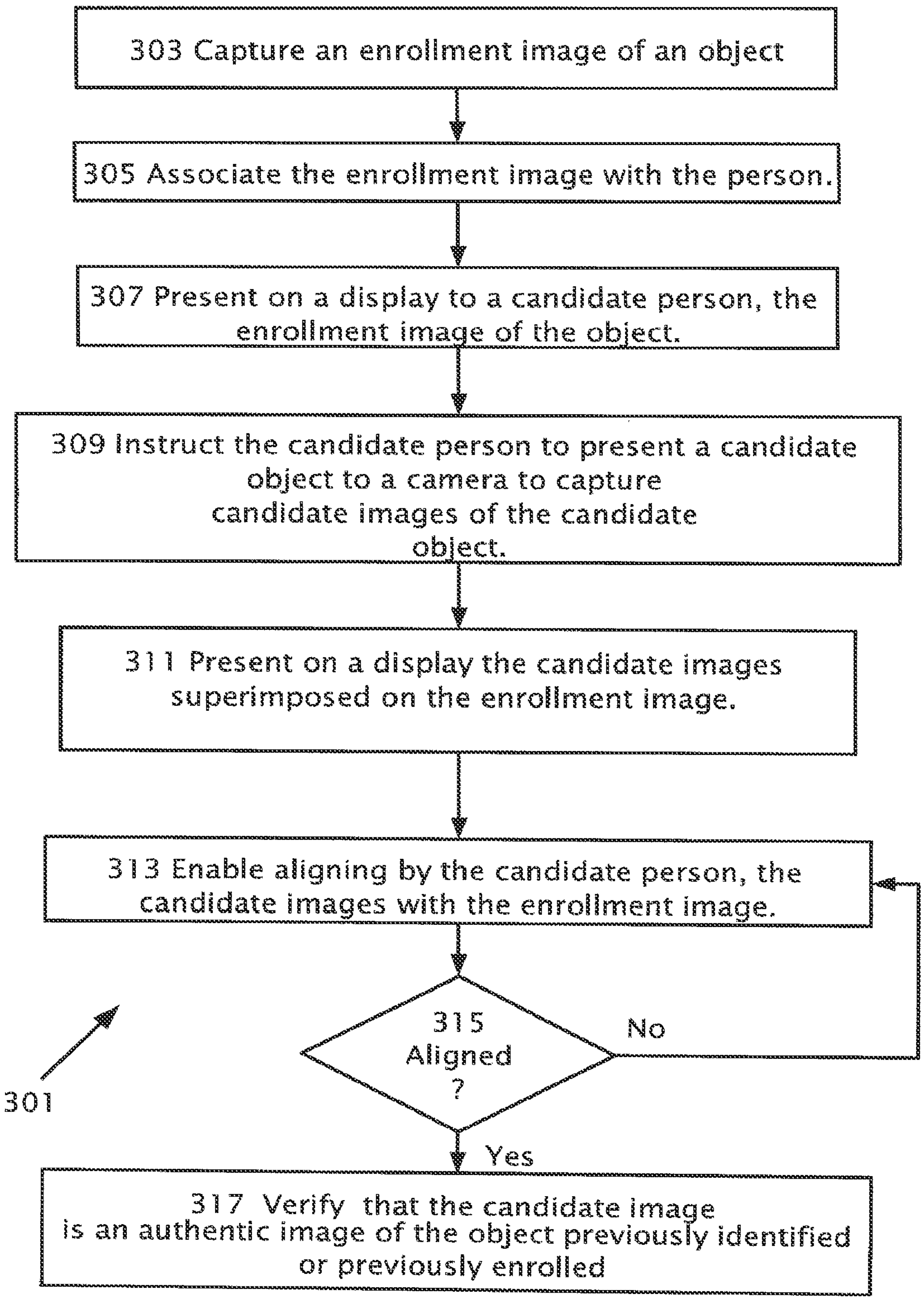
FIG. 2 shows a flow diagram of a method, according to a feature of the present invention.

121. Mobile computer system 100 includes a processor 1 IOC connected to local data storage 102. A data communications module 104C operatively connects processor 1 IOC to data network 106. A cellular communications module operatively connects processor 1 IOC to cellular network 121. Mobile computer system 100 may include operatively connected to processor 1 IOC peripheral accessory devices such as a display 109, global positioning system 107, a camera 105, a microphone 111, a speaker 113, a vibrator 115 and accelerometer [gravity sensor, Bluetooth™ IR sensor (not shown). Reference is now made to FIG. 2 which shows a method 301 of biometric enrollment and authentication, according to a feature of the present invention. Method 301 includes steps 303, 305 for enrollment of a person and steps 307-317 for authentication/non-authentication or verification of a person. In step 303, an image of an object, e.g. card of a person is captured, using camera 105 of mobile computer system 100 for instance, to capture an enrollment image of the object e.g. card.

Figure 2A:
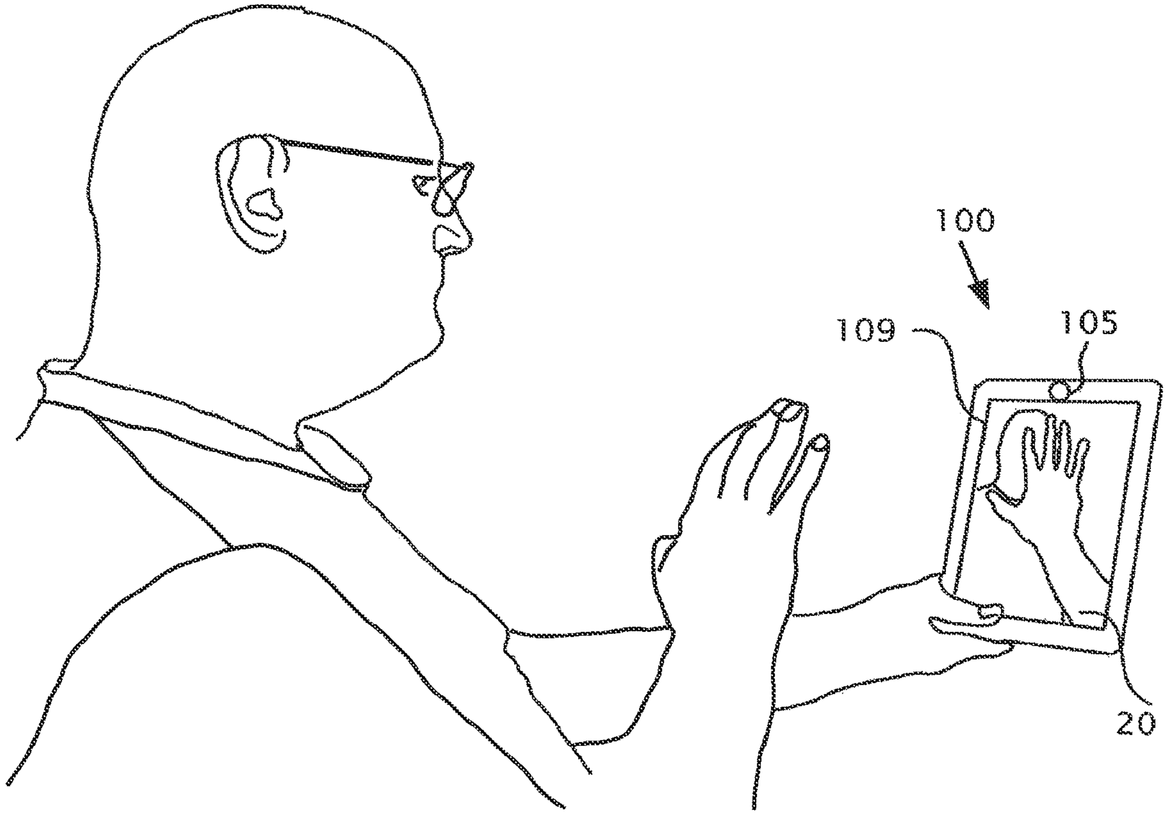
FIG. 2*a* shows an embodiment of the invention wherein a user uses a mobile device camera to start an identification process of the invention.
Figure 2B:
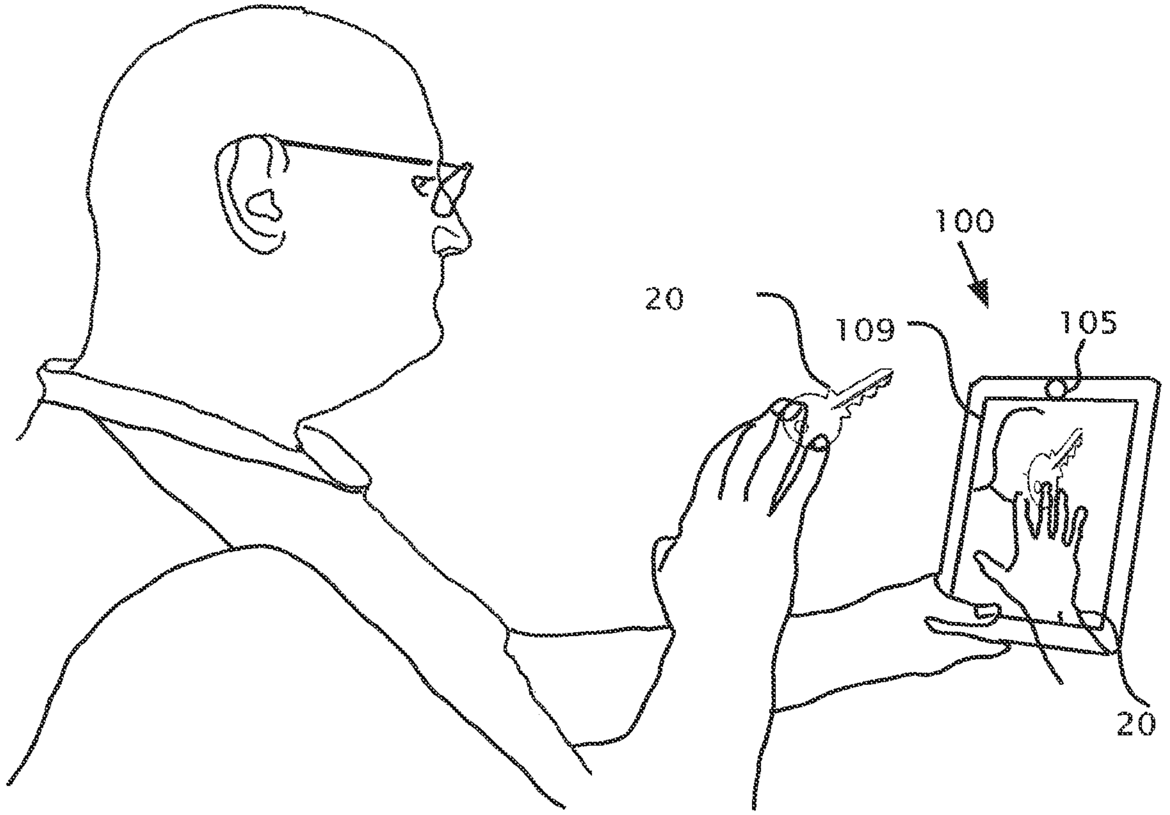
FIG. 2*b* shows an embodiment of the invention wherein a user holds an object in view of the mobile device camera to start an identification process of the invention.

Reference is now also made to FIG. 2*a* which shows a person holding his hand without a key, and then in FIG. 2*b* with a key 20 free in space with respect to the camera 105 and/or display 109 (of an IPAD™ for example being used as an example of a mobile computer system 100). Display 109 shows an enrollment image 20 of the key, palm, wrist plus arm of the person and the background which includes the face and torso of the person. Camera 105 and/or display 109 may be mounted on a stand so that both hands of the person are free. FIG. 2*a* is by way of example only, another object such as card, document, any photo or scene may be captured to provide enrollment image 20.

Figure 3:
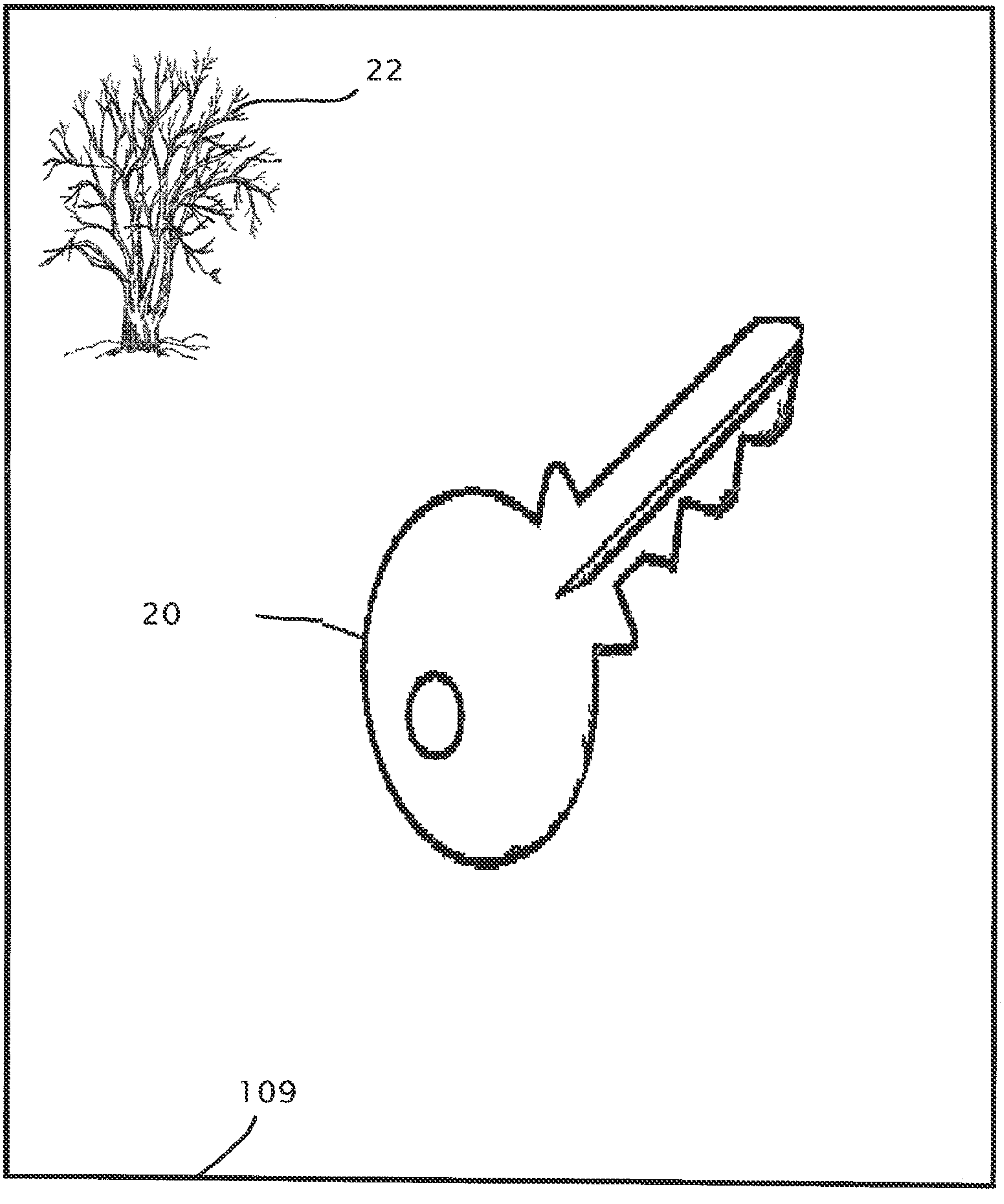
FIG. 3 shows an enrollment image presented on a display with a background also captured according features of the present invention.

Reference is now made to FIG. 3 which illustrates enrollment image 20 including only the key presented for example on display 109 of mobile computer system 100. A feature according to embodiments of the present invention includes avoiding processing to find the contour of enrollment image 20 of the object e.g. key; hence in FIG. 3, the image of the key is presented with the background captured during enrollment. Background is shown schematically with an image 22 of a bush in FIG. 109.

Referring back to FIG. 2, in step 305 an enrollment image 20 is associated with the person. The association of the enrollment image 20 with the person may include the name of the person, date of birth of the person, an identification (ID) number or national insurance or social security number of the person.

Step 307 begins an authentication/non-authentication process of the person previously enrolled. Authentication may be in a different location and/or time or date or using a different computer system from enrollment steps 303-307.

Figure 4:
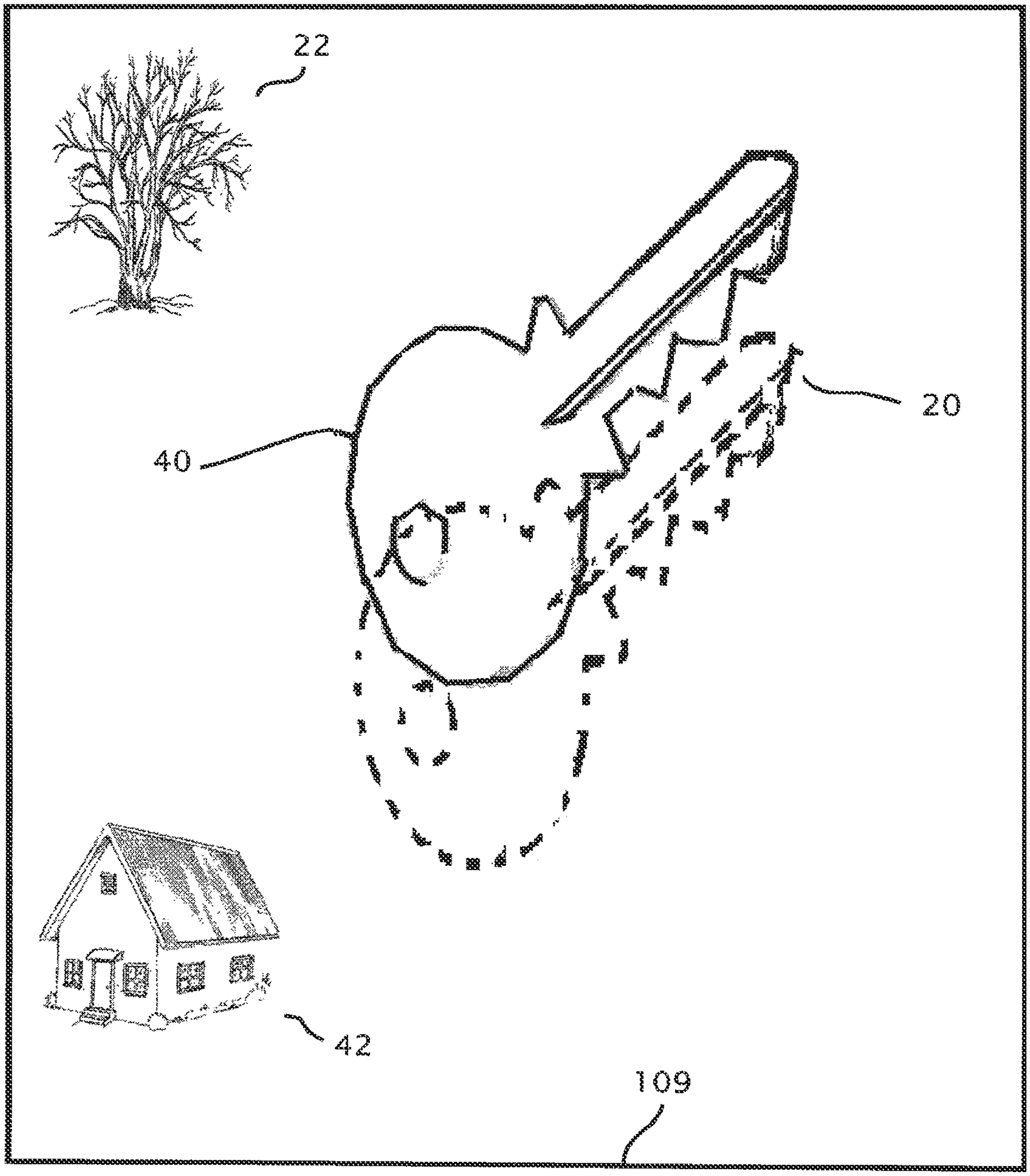
FIG. 4 shows enrollment and authentication images superimposed with respective backgrounds, according to the method illustrated in FIG. 2.

Reference is now also made to FIG. 4 which illustrates display 109 during authentication. In step 307, enrollment image 20 is presented on display 109 along with background image 22.

Referring back to FIG. 2, in step 309, a candidate person is instructed to present the object, e.g. key, to a camera 105 and a time series, e.g. video, of candidate images 40 are captured of the key of the candidate person. Candidate images 40 may include image of the candidate object of the candidate person as well as respective background images 42. According to a feature of the present invention, as in enrollment image 20, candidate images 40 are presented with respective backgrounds while avoiding finding the contour of the image of the object to extract and present an image of the object without background. In FIG. 4, background of candidate image 40 of a key is shown schematically with the image 42 of a house.

Still referring to FIG. 2, in step 311, the time series of candidate images 40 are displayed on a display 109 while capturing (step 309) along with enrollment image 20 previously captured in step 303. Therefore in step 311, one or more candidate images O are superimposed on the enrollment image 20 with the respective backgrounds 42 and 22.

In step 313, the candidate person aligns, i.e. positions and repositions the object, e.g. key, in front of camera 105 so that one or more candidate images 40 align with enrollment image 20 on display 109. To enable alignment in step 313, enrollment image 20 and or candidate images 40 after being captured (step 303), may be processed such as with horizontal mirror inversion prior to display (step 311) on display 109.

The basis for alignment in step 313 may be a feature of the object in the candidate images 40 with a corresponding feature in the enrollment image 20. The feature and the corresponding feature may be a contrast based feature such as edges lines points or any visual differential area located in the object image object on the object or candidate object respectively. Alignment step 313 includes alignment in horizontal, vertical image coordinates, angular orientation in image space, and real space distance to camera 105. In decision block 315 when one or more candidate images 40 are aligned with the enrollment image 20 on display 109, verification step 317 may be performed. During verification, (step 317), the candidate person may be verified as a previously enrolled person and/or previously identified person in steps 303-305 by comparing the enrollment image 20 with an authentication image previously stored according to any techniques known in the art of image processing.

In decision block 315 when one or more candidate images 40 are not yet aligned with the enrollment image 20 on display 109, alignment continues in step 313 by the candidate person.

Reference is now made to FIG. 5 which illustrates another method 501 of biometric enrollment and authentication, according to a feature of the present invention. Biometric method 501 includes steps for enrollment and authentication of a person. In step 503, an object of a person is captured using camera 105, to produce an enrollment image 20 of the object, e.g. key. In step 305 the enrollment image 20 is associated with the person. Step 507 begins an authentication stage, the enrollment image 20 is presented on a display 109 with or without background 22. In step 509, a candidate person is instructed to present his/her key for example, to a camera 105 and a time series of candidate images 40 are captured of the object, e.g. key of the candidate person. Candidate images 40 include an image of a candidate object of the candidate person presented with or without background image 42. In step 511 the time series of candidate images are displayed on a display 109 during capturing (step 509) along with display of the enrollment image 20 (with or without background 22) previously captured in step 503. In step 511, the candidate images 40 are superimposed on the enrollment image 20.

In step 513, the candidate person is able to align, position and reposition his/her object in front of camera 105 so that candidate images 40 are aligned with enrollment image 20 on display 109.

In order to facilitate alignment, enrollment image 20 and/or candidate images 40 after being captured (step 503), may be processed with horizontal mirror inversion prior to display on display 109.

The basis for alignment in step 513 may be an image of a feature of the object in candidate images 40 with a corresponding image of a feature in the enrollment image 20. The feature and the corresponding feature may be line, dot, and area on object with visual differential from other part on the object or candidate object respectively. The term “feature” as used herein in the context of alignment of an object may exclude “contour” or the outer edge the body part. Alignment in step 513 may be performed without aligning imaged contours of the object. The image contours are not necessarily visible on display 109 for candidate images 40 and/or enrollment image 20. Alignment step 513 of an image feature includes alignment in horizontal, vertical image coordinates, angular orientation in image space, and real space distance to camera 105.

In decision block 315 when one or more candidate images 40 are aligned with the enrollment image 20, authentication/non-authentication may be performed. Authentication of the candidate person may be verified as the previously enrolled person by comparing the enrollment image 20 with the authentication image. Authentication is verified by associating (step 317) the candidate image as an authentication image of the candidate person. In decision block 315 when the time series of candidate images 40 are not fully aligned with the enrollment image 20 on display 109, alignment by the candidate person the candidate images 40 with the enrollment image 20 continues in step 513.

Figure 6:
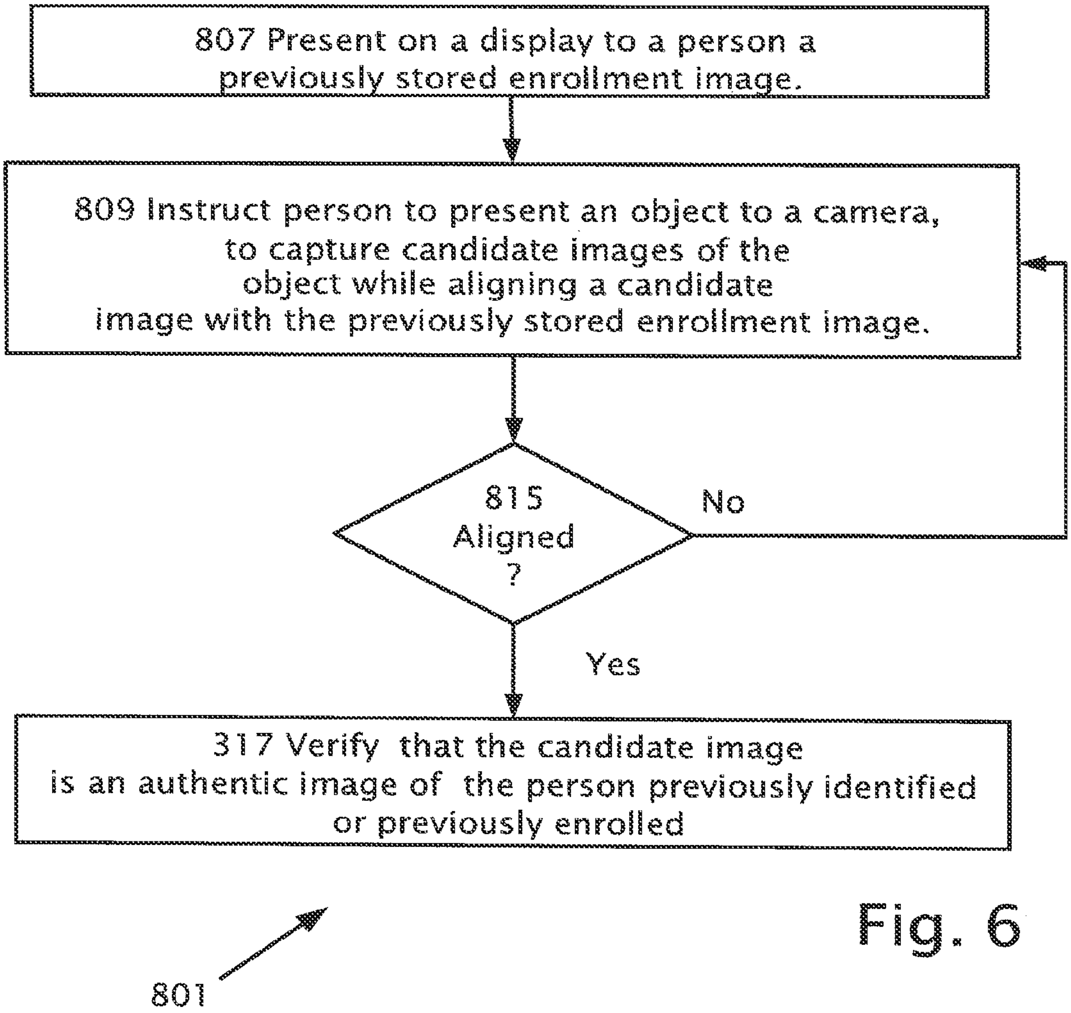
FIGS. 6 and 7 show examples of previously stored enrollment images respectively on a screen according to a feature of the present invention.
Figure 7:
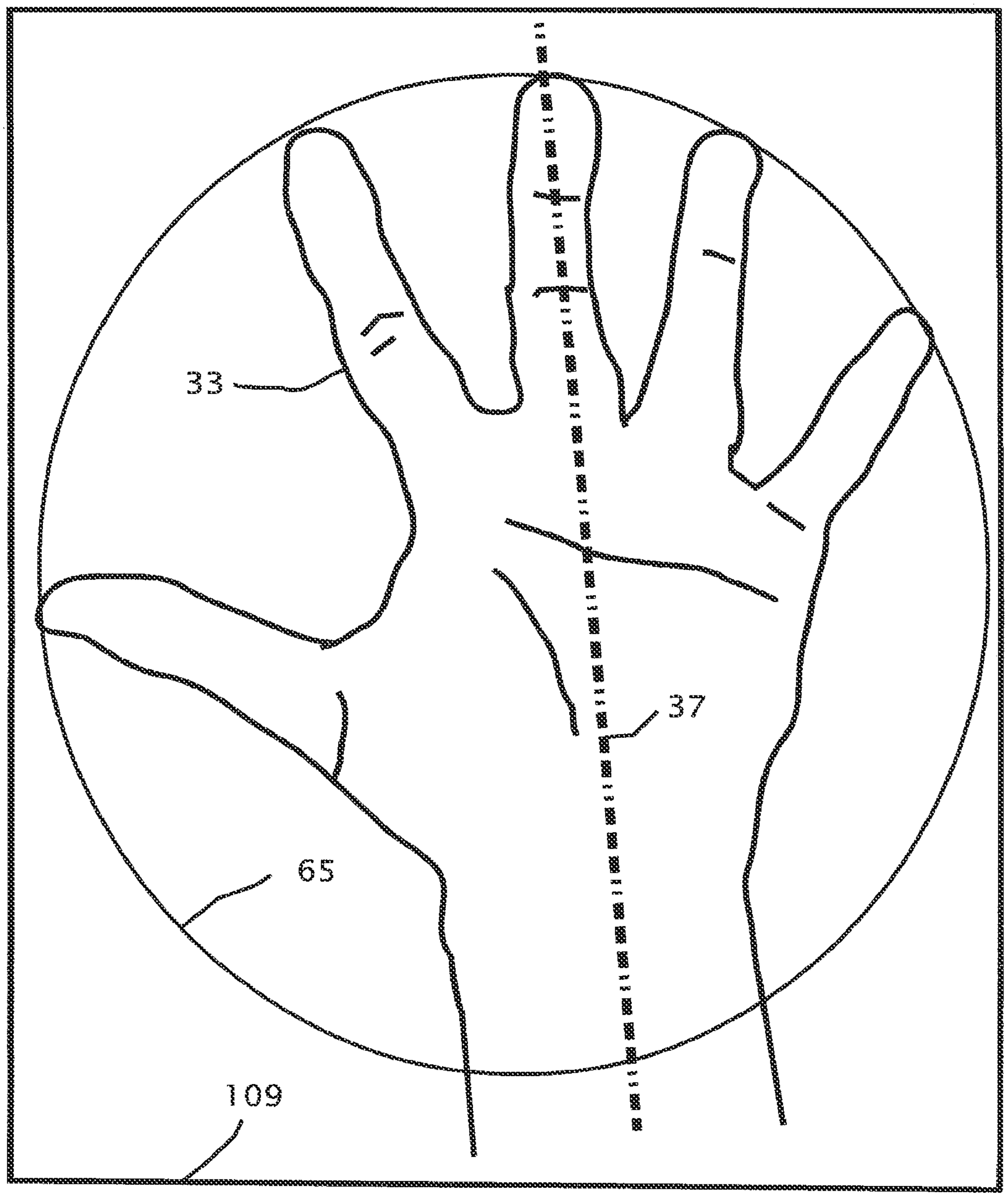
Figure 8:
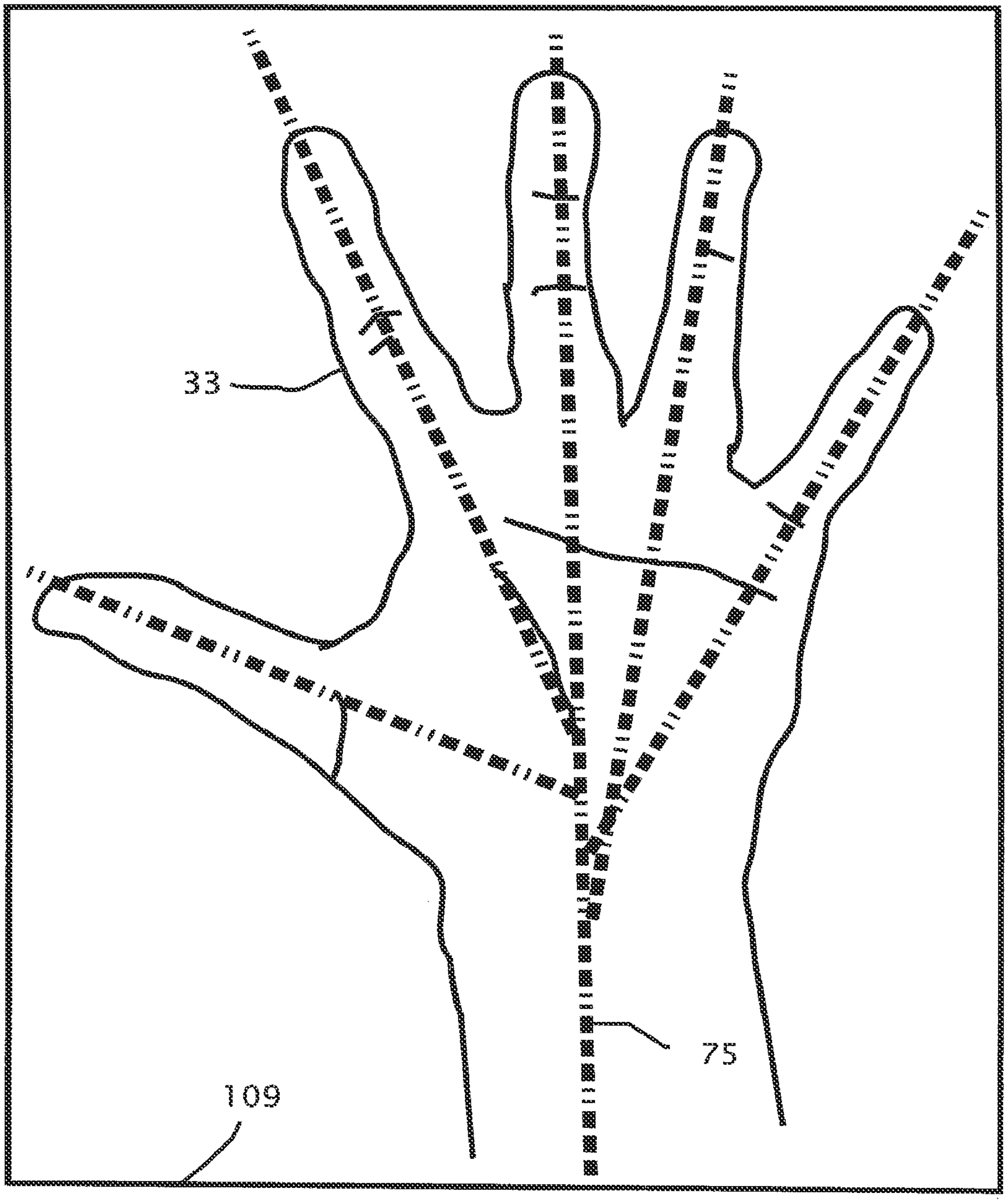
FIG. 8 shows a flow diagram of a method, including different features of the present invention.

Reference is now made to FIG. 6 which shows a method 801, according to a feature of the present invention. In step 807 a previously stored enrollment image is shown to a person for enrollment purposes. Reference is now also made to FIGS. 7 and 8 which show examples of previously stored enrollment images 65 and 75 respectively on display 109. Enrollment image 65 is an ellipse in which the person aligns a picture of a hand 33 within ellipse 65. A dotted line 37 is shown going through ellipse 65 may be used to align the image of the middle finger and wrist. Image 75 includes dashed lines to which the person aligns respective images of the wrist and fingers of picture of the hand 33.

Referring back to FIG. 6, in step 809, the person is instructed to present an object, e.g. picture of a hand 33 to camera 105. In step 809, candidate image 40 of the person is captured while the person attempts an alignment of candidate image 40 with the previously stored enrollment image displayed on display 109. With respect to image 65 and step 809, the person aligns images of each fingertip just within perimeter of ellipse 65 and the middle finger are aligned symmetrically around dotted line 37 going through ellipse 65. With respect to image 75 and step 809, the person tries to ensure that each finger of the hand within the picture 33 is centered and in parallel with dotted lines of image 75. In decision 815, once the alignment in step 809 is achieved, verification is performed by verifying (step 317) candidate image 40 as an authentic image of the person. Otherwise alignment by the person continues with step 809.

When previously stored enrollment images 65/75 are used, the enrolling person may select one or more previously stored enrollment images 65/75 from a bank of for instance ten to one hundred stored images stored in memory 102 of mobile computer system 100, for instance with which to perform enrollment capture step 503. The selection of the previously stored enrollment image 65/75 provides for additional security and allows for the person to select an enrollment image 65/75 suitable to her hand 33 in this example.

Figure 10A:
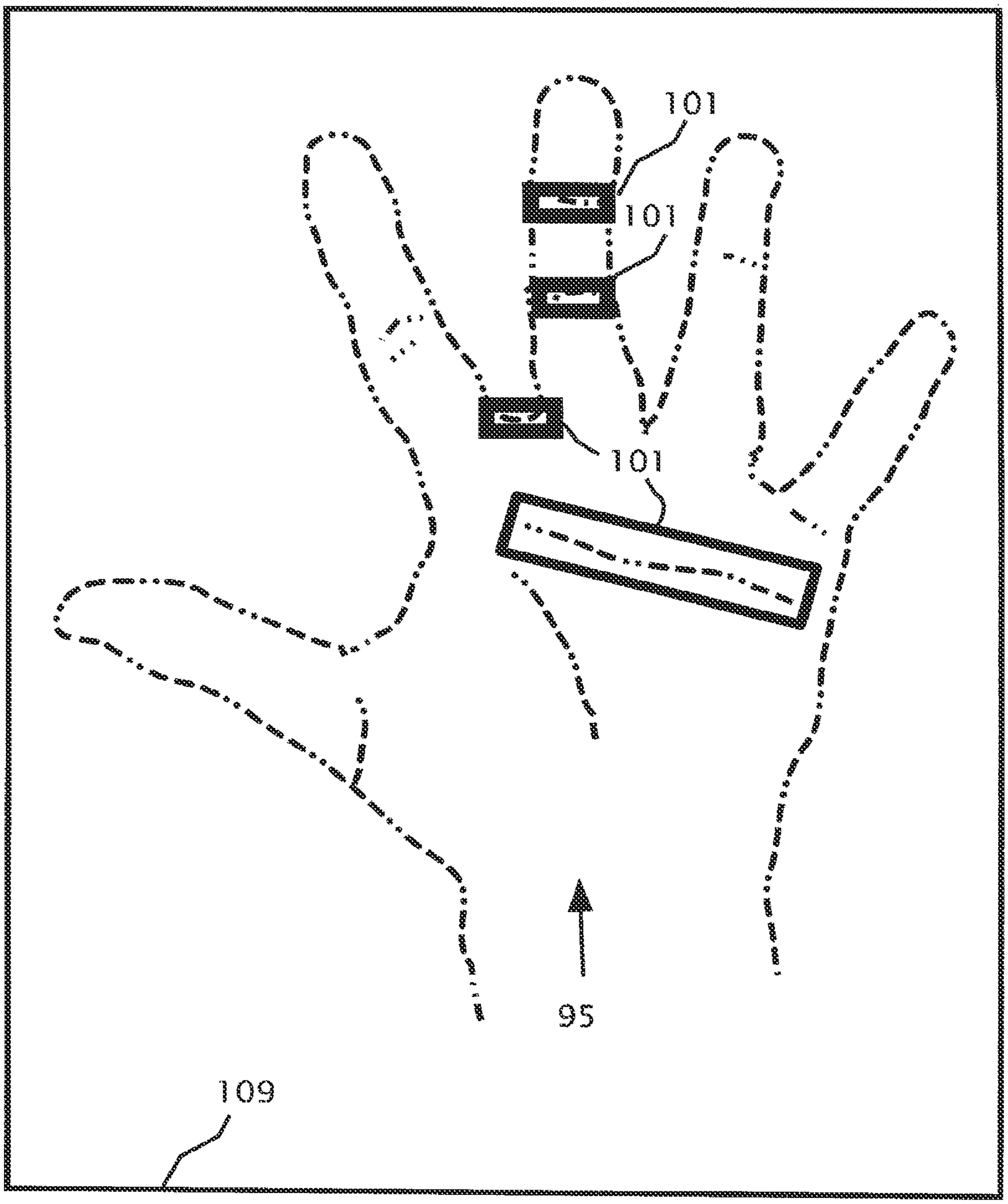

Reference is made to FIGS. 9 and 10*a* which show a method 901 and an enrollment image shown on display 109 respectively, according to a feature of the present invention. In step 903, enrollment image 95 of an object of a person is captured with camera 105. The object as shown in enrollment image 95 (FIG. 10*a*) is the hand of the person. Enrollment image 95 as captured in step 903 is then presented to the person on display 109 (step 905). On the enrollment image, the person is able to superimpose (step 907) symbols 101, e.g., rectangle over features of the object as presented on display 109. Features of the hand as shown in FIG. 10*a* may include ridges, lines, wrinkles, scars or the curved portion connecting fingers.

Superimposition (step 907) may include the person relocating, resizing and/or rotating the symbols over the features.

In decision 909, upon successfully superimposing symbols 101 on display 109 with features of the hand. The symbols 101 are stored along with respective positions, orientations, and features of the hand and/or symbols 101 in image space as the enrollment image 95 (step 911). If the symbols 101 on display 109 are not yet superimposed with features of the hand, superimposing continues with step 907.

Referring back to FIG. 9, authentication of a candidate person now continues with steps 913-921. In step 913, the enrollment image 95 stored in step 911 is presented on display 109. Mobile computer system 100 in step 913, instructs the candidate person to present a candidate body part to a camera. With the candidate body part being a hand for example, a time series of candidate images are captured of the hand with camera 105. During capturing step 913, the time series of candidate images are superimposed (step 915) with enrollment image 95 and displayed on display 109. In step 917, at least one of the candidate images may be aligned with enrollment image 95 so that corresponding features in enrollment image 95 and one or more of candidate images are aligned. In aligning (step 917), the candidate may move her hand in front of camera 105 so that features, e.g. lines, wrinkles, etc used for identification known only by the enrolled person are aligned with symbols 101. In decision 919, upon a successful alignment of the correct features with the symbols then verification 317 may be performed based for instance on the teachings of U.S. Pat. No. 7,327,858. Otherwise, upon unsuccessful alignment or denial of authentication, the candidate person may instructed again to present her hand again in front of camera 105 with step 913. The user can use simultaneously, or in a specific sequence the frontal, back or any other cameras of the mobile device.

Figure 10B:
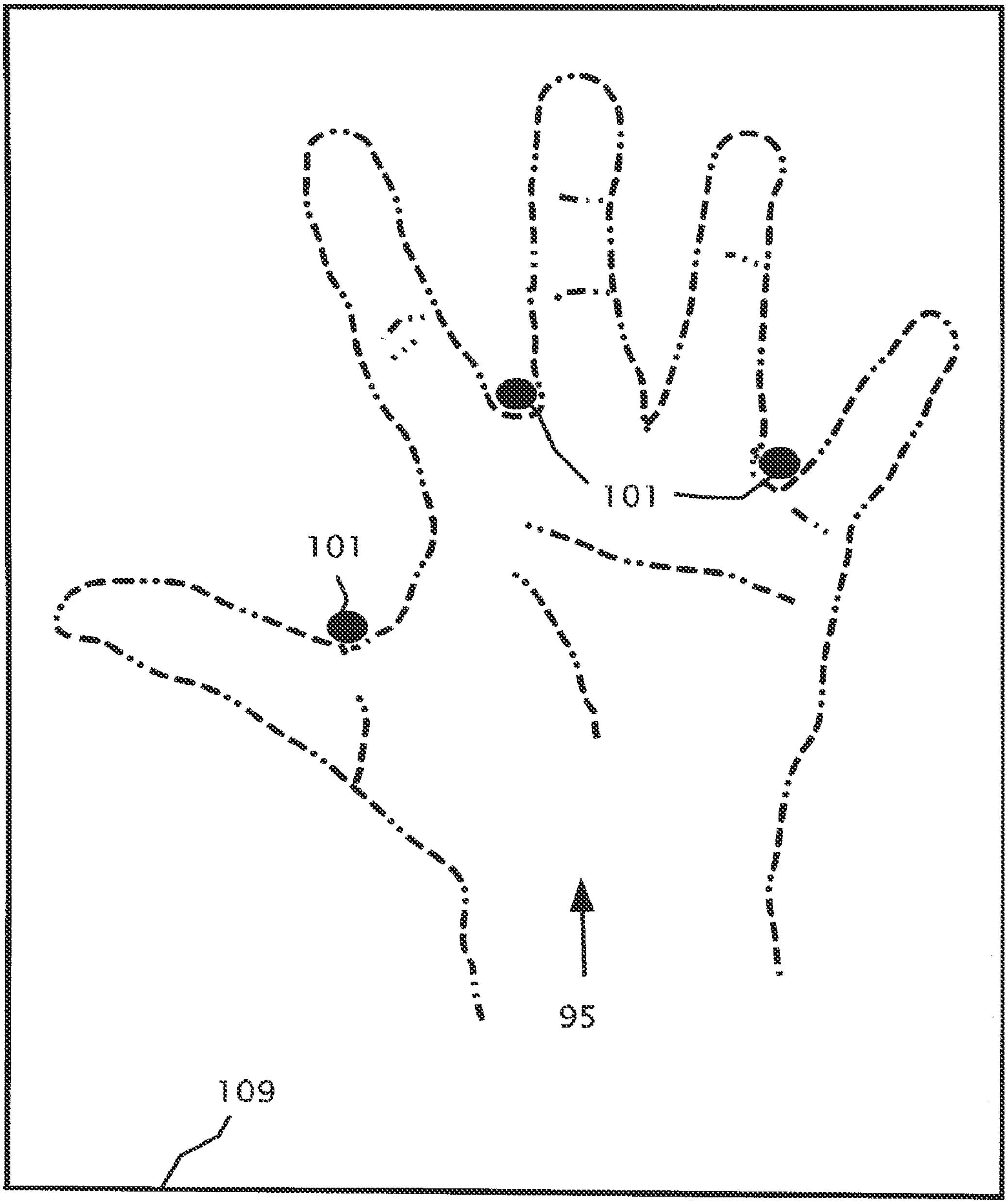

Reference is now made to FIG. 10*b* which illustrates another example of the use of symbols 101 shown as software pegs 101 on display 109. Software pegs 101*b* may be positioned by the person so that software pegs 101 locate the curved connection between fingers, for example. Reference is made to FIG. II which includes a flow diagram illustrating a method 1101, according to a feature of the present invention. In step 1103, a person is presented with multiple previously defined enrollment scales on display 109. Examples of previously defined enrollment scales shown on display 109 are shown in FIG. 12 as scales or graticules 1201*a*1201*c* which have respective graticule lines 1203*a*-1203*c*.

Figure 11:
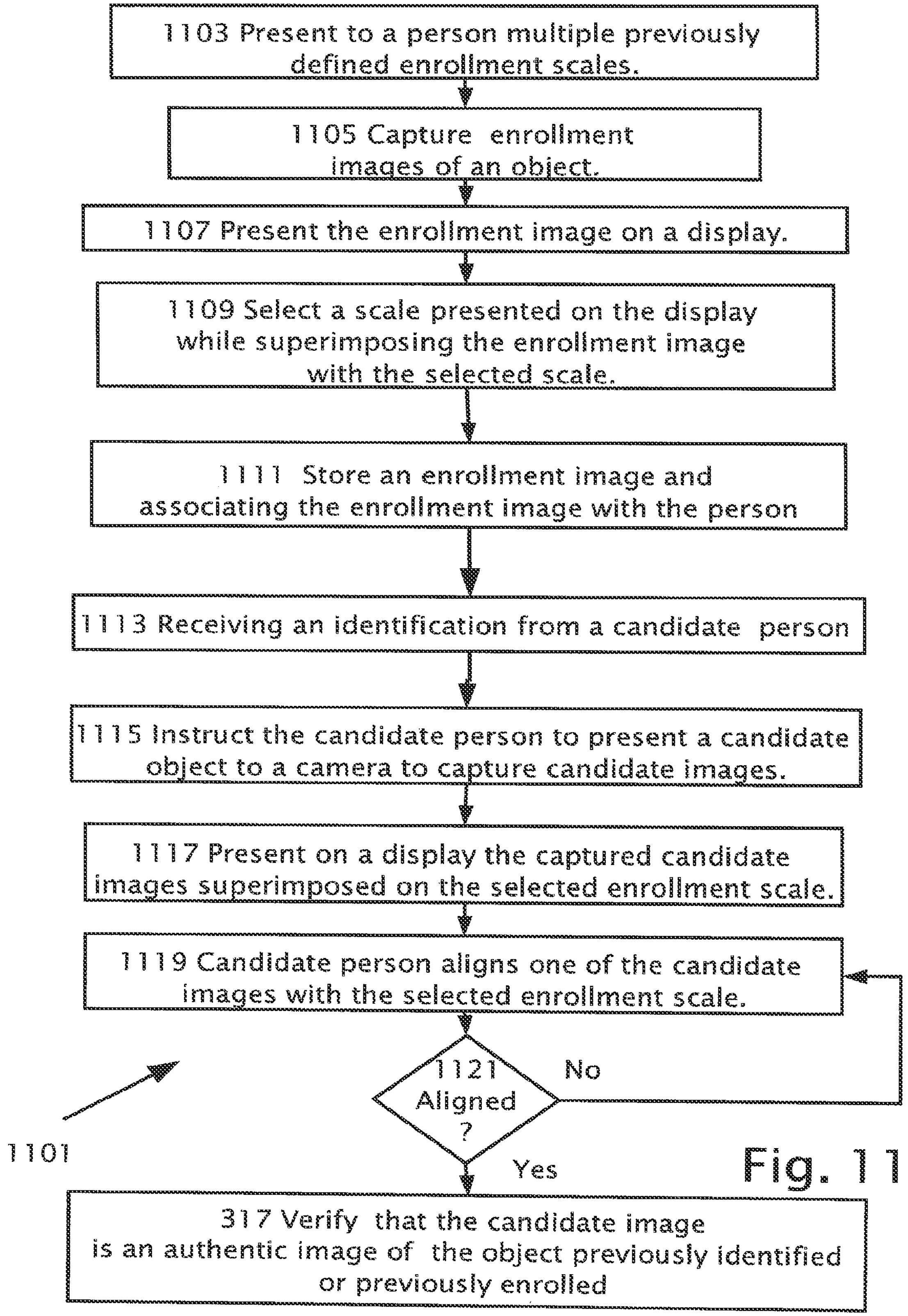

Referring back to method 1101, FIG. II in step 1105, enrollment images of an object of the person are captured with camera 105. In step 1107, enrollment image of the person is presented to the person on display 109. The person is able to select (step 1109) a graticule scale 1201*a*-1201*c*, whilst enrollment images are superimposed with the selected graticule or scale 1201-1201*c*. Using graticule 1201*b* as the selected scale, the person may reposition or rotate selected graticule scale 1201*b* so that graticule line 1203*b* is positioned on the top part of the door 1205*b* as shown in FIG. 14. Alternatively, the person rotates and positions their hand so that graticule line 1203*b* is positioned on line 1205*b* of the top part of the door as shown in FIG. 15. Referring back to method 1101, FIG. 11, in step enrollment image 20 of the object of the person is stored along with selected graticule scale 1201*b* and associated with the enrolled person.

Authentication steps 1113-1123 are the steps which verify that a candidate person is or is not the person previously enrolled in steps 1101-1111. In step 1113, identification (ID) number of a candidate person may be received by mobile computer system 100.

The candidate person is instructed by system 100 to present a candidate object to camera 105 so as to capture candidate images 40 of the candidate object (step 1115). The captured candidate images are presented (step 1117) superimposed on the selected enrollment scale 1201. In step 1119, the candidate aligns one of the candidate images with selected enrollment scale 1201. In decision block 1121, if there is an alignment between candidate image 40 and selected scale 1201, then candidate image 40 may be verified or not verified as an authentic image of the candidate person as the previously enrolled person in step 1123. Otherwise in decision 1121 alignment by the candidate person may continue in step 1119 or after number of failed alignments, the candidate person is notified that an authentication of them was unsuccessful.

Further security features are involved in steps 1115 and 1117. In order to verify (step 317) candidate image 40 as an authentic image, candidate object and features need to be identical to the object and features used during enrollment. Moreover, selected scale 1201 has to be selected by the candidate person as that used during enrollment, to achieve verification that the candidate image is authentic.

Figure 1:
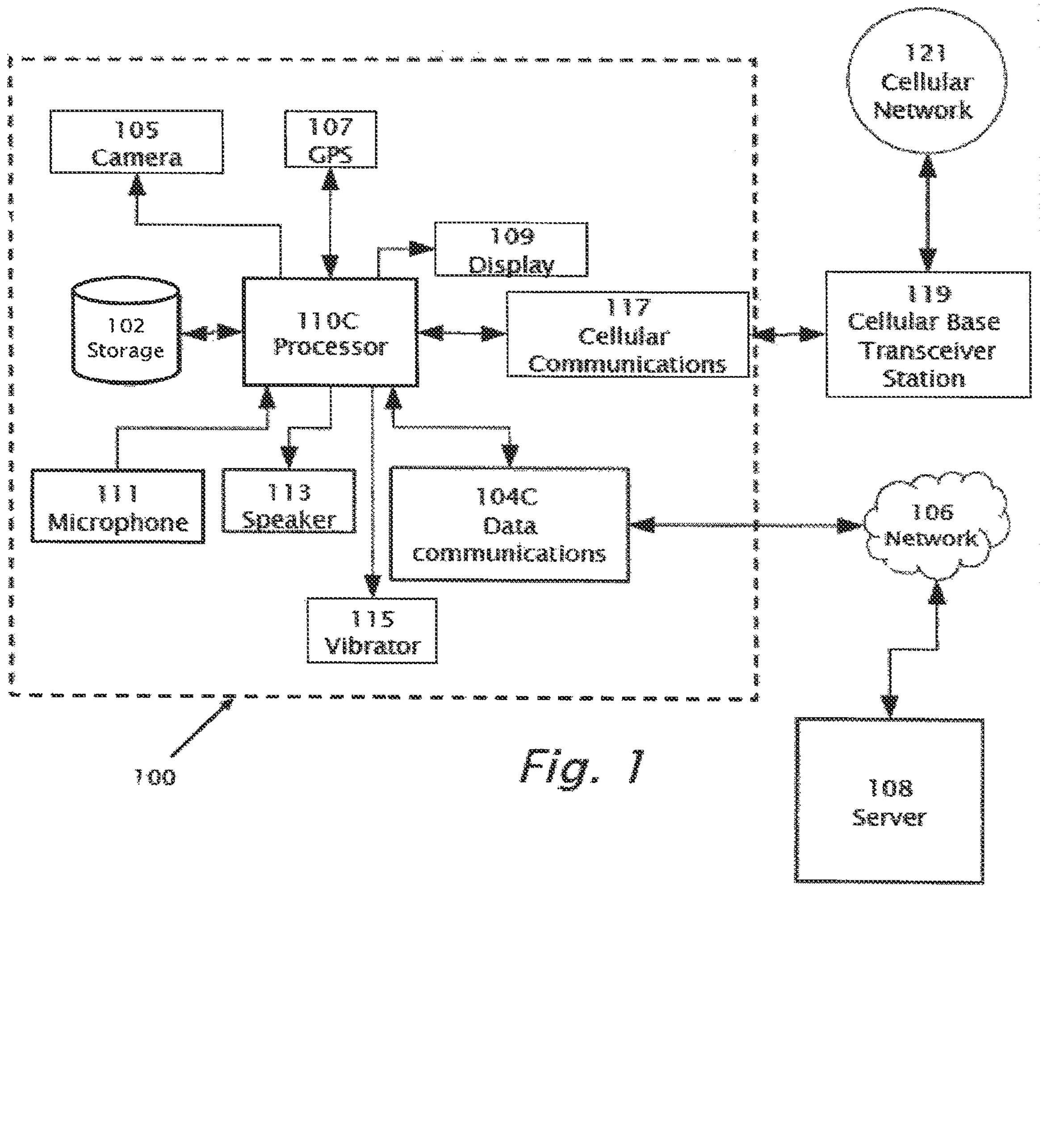
FIG. 1 illustrates a simplified block diagram of a mobile computer system, for operation of different features of the present invention.

During the enrollment processes shown above in FIGS. 1 3, 1 4, there may be no knowledge by mobile computer system 100 of the object details (size etc) of an object to be enrolled. Therefore, in the enrollment stage, several graticule scales 1201 which have respective graticule lines 1203 may be displayed on display 109 and the person aligns their object to each scale 1201. Objects can be aligned to scales 1201 where the whole object should be placed inside a rectangular box of scale 1201.

Referring to FIG. 13, when the person aligns the object door on display 109 to each of the scales 1201 during enrollment, as a result, the object may be actually placed at different distances to camera 105 for each of the scales 1201. Mobile computer system 100 may select the best scale 1201 for the user where the features extracted from enrollment image 20 related to corresponding scale 1201, are the most robust and distinct. From this point on the best selected scale 1201 may be used for the person and an enrollment image saved and used during verification.

Regarding the one of many verification processes described above. The same enrollment mechanism may be used by any one of the verification process described above and a candidate person will have to select the required scale 1201 and place the object according to their choice of object alignment placement. In the event of one too many attempted verifications of the candidate person, the candidate person may alternatively align their object exactly as in the enrollment phase without presenting any information regarding their identity. The number of attempted verifications of the candidate person may now be limited only to related enrollees in the same scale and rotation and the user may be identified.

Using graticule 1201*b* as the selected scale, the person may reposition or rotate selected graticule scale 1201*b* so that graticule line 1203*b* is positioned on 1205*a* of the shoes of the lady in the picture as shown in FIG. 14. Alternatively, the person rotates and positions the mobile camera so that graticule line 1203*b* is positioned on line 1205*b* of the top line of a door as shown in FIG. 15. The alternatives presented by FIGS. 14 and 15 may apply to both the enrollment and verification processes or just to the enrollment process. In the verification process the scales 1201 may be predefined and unchangeable on display 109.

The process of verification may be repeated in a specific way. For example, during enrollment the user selects one of scales 1201*a*, 1201*b*, and 1201*c* and aligns object 1205*a* the woman shoes to scale 1201*b* to line 1203*b*. If verification is successful, the user continues to a second verification step with a different scale and so on. For a more secure option, the user during enrollment may combine scales 1201 in sequential verification steps and hence create a password from the ordered sequence of scales 1201.

In another implementation a user can capture a card and use a sequence of card placements and alignments with different scales or symbols on screen. The steps of card alignment and the timing of the card alignment with scales are registered in such a way that during authentication an imposter cannot guess the right sequence and timing. That way an imposter will need the card, mobile with specific scales and the right sequence of card placement and the timing of each step. For example the user aligns the card with any first scale for two seconds and then aligns the card on two more scales for 0.5 second. The system will verify the card's authenticity as well as correct alignment as in the registered sequence of scaled symbols and timing of card presentation.

The usage of different cards of different sizes such as driver's license or passport may require different symbols sizes. In order to verify that the card is in the right focal distance from the camera to which the card is in the best focus state. For example, a driver's license will have a small bounding square on the screen, whereas for a passport a much bigger square may be required on the display. When the user wishes to authenticate a card it should be aligned with the matching bounding square on screen. That way the card can be read in the best focal distance without any auxiliary reading devices.

Wherein the usage of a device may be required, a mobile device is placed in a way that a reflective mirror reflects the inner palm of the hand. In this implementation the mobile camera can capture the palm of the user and authenticate the user. Due to the mirror, the user can see the display of the mobile (due to the angle of mobile placement) and interact with the mobile camera. Additionally, the user can capture the back part of the hand and then place the hand in the lower part of the device. This method allows interaction with the mobile device display as in the current invention and at the same time identify the person using the hand. In this specific implementation the mobile device can be positioned by users on the auxiliary device and together with the mirror take a picture of the hand placed on a surface like or peg like device to stabilize the hand in a fixed location and distance from the mobile back camera.

This way the user can place any mobile camera and create a most robust solution. If the upper part of the hand is fetched, no mirror is needed and the hand is placed underneath the mobile device. Due to the mobile position, in this implementation the user can interact with the mobile display as in the present invention for the purpose of access control, pos and any other application requiring authentication etc.

Reference is now made to FIG. 156 which illustrates sequence steps for authentication and registration. The user is instructed to capture several QR codes from a grid of 9 square than contain different QR codes. On the device display 109 a symbol display box displays the view image. The symbol display boxes 1301, 1301*a*, 1301*b* and 1301*c* display the captured image in each of the four steps of authentication and registration. Timer symbol 1303 is displaying either the time since start of the whole sequence or the length of capture time for each step as defined in the registration. The display boxes of the captured images in 1305, 1307, 1309, and 1311 squares are coordinated with the time stamp in 1303 for each step. In phase one the user captures on display box 1301*a* only the QR codes in square 1305 and neighboring square on the left (which is part of 1307). In the second step in which is performed in box display 1301*b* the user captures QR codes in squares 1309 and 1311 as displayed in 1303. In the third step the user captures on box 1301*c* the four QR squares from box 1307 for the length of 3 seconds. Once all of the QR capturing steps were done and aligned correctly in the right order and in the registered timing frames on screen in box 1303, the user is authenticated.

The user can alternatively capture and align grid squares of pictures and symbols either on a card, wall, sign and any other available surface. During registration the user captures a sequence of grid pictures each aligned with on-screen grids or cells in any desired combination. Upon authentication, the user holds the mobile device and aligns the on-screen grid symbols with the grid pictures as in the registration steps sequence. The authentication steps can be synchronized with a timer or with any other display symbol measured on screen. The user can either align the mobile camera with the object or align the card with the camera. Additionally, any other combined stationary and tangible movable objects such as cards can be part of the desired sequence of authentication.

Another example is if there are nine squares of the same size arranged like on the iPhone™ password screen. During verification the user may present the lines of one finger inside a specific square and then the lines of another finger at in a different specific square and so on. The combination of steps is saved in the enrollment phase. During the verification the user follows the same verification steps as defined during the registration. Hence an imposter cannot predict the combination of finger placements and selections of squares in the order performed during initial enrollment.

The on screen symbols as aligned with the object viewed can be predefined or user defined in any order and placement. The symbols can be resized, reordered, moved or hand written by the user in such a way that allows the user to align the on screen symbols with the viewed scene as in the registration. The user must select a reproducible scene so the authentication would succeed.

For example, if the user selects a tree as part of the scene image it is possible that the tree will change form and the image would not be reproducible and not eligible for usage. Additionally, the sequence of defined steps during registration and upon followed authentication can combine any form of password like keyboard typing. Said password typing can be combined within the registration steps either alone or with the presented steps as described in the present invention. For example, the user can type the password with specific timing sequence: different timing for pressing each password letter or time length of gap between each character or any other combination. During authentication a visual time display will be present comprising of: timer display, progress bar, or any other equalizer look alike or any other time display notification for showing the desired measured character pressing on each character and any other combination of symbols for sequence timing of the keyboard character press time length and gap between character presses. In such a way an imposter even if the password is known cannot use it since the right sequence timing of the character pressing is not known to him. That way instead of using multiple passwords the user can use same password and it would be hard to break due to the endless password like permutations.

The keyboard sequence timing can be timely combined in any combination with all other sequence view images alignment and hand written symbols or any other presented way of authentication.

It is believed that if a person could use the same easy to remember password while maintaining the highest level of security, it would change the way people perform identifications.

An imposter that obtained the password cannot use it if he does not know the right step sequence since there are many combinations. Since the following steps are easily reproducible and intuitive, the user can create a level of complexity as wanted and not be limited by specific implementation as long as the sequence is reproducible. Referring now to FIG. 164 illustrates a hand written user symbol such as signature biometrics. During registration, at the first step the user paints on the screen device 109 a registered symbol or signature as shown in 1401. Subsequently, during the second step the person aligns auxiliary symbols or markers of any kind with the registered symbol or signature of step one 1401 display symbol. During the registration the user in the second phase uses the display box 14023 to erase a part of the signature. Auxiliary symbols comprise of any symbol aligned with registered symbol or signature, removing parts of the registered signature, distortion of any kind of the signature and any other symbol marking parts of the signature.

During verification the display can contain auxiliary markers/hints of phase two of the registration 14023 display. The presented process allows high levels of signature biometrics authentication. The signature distortion of step two comprises of blurring, geometric distortion or any other image manipulation to disable said enrollment images reconstruction as in 1401.

Another possible implementation comprises the following steps: In step one the user applies a signature or a symbol on display 109 in the symbol box 1401. In step two, signature on the display box symbol 1401 is displayed on screen 109 and the user applies arbitrary symbols, scrambled lines and any other symbols to conceal original signature as in symbol box display 1402. Upon authentication, the user views the scrambled lines with the concealed signature in display symbol 1402. The user applies the signature or symbol by following the lines of the concealed signature or symbol of the registration phase one 1401. In this implementation an imposter will have a hard time to differentiate the signature from the other concealing symbols of phase two of the registration 1402. The new level of authentication method sets a new hard to break within short limited time frame. The handwritten mark or symbol can be combined with any other form of user authentication. During authentication the user is displayed with one or more randomly selected enrolment images in a consecutive manner with an unknown combination.

Additionally, the enrolled biometric method can comprise from a set sequence of registered images or registered video as described herein. Upon authentication the user shall superimpose the object with the on screen registered video or registered image sequence of objects or symbols moving on screen as presented within the registration.

For example, upon registration the user can continuously superimpose selected moving line on screen with left edge of the driver license. Alternatively, the user can superimpose the driver license with the moving line at specific synchronized locations of the line on screen. In yet another example, the user can define a set of symbols such as lines or symbols moving on screen. During registration, two lines on screen are rotating at different directions and the user superimposes the object at specific synchronization and location of the lines on screen to one or more of the moving lines. Upon authentication, the two lines are displayed on screen and the user shall follow the registered synchronized location, time with the object. Only the user knows the correct line alignment and synchronization between the line and the object and would be authenticated as an authentic person.

The user could alternatively capture a view image and align or apply symbol in specific location and time on the view image as an additional sequence step of authentication method.

In yet another example of time display symbols, the display can contain a clock like display with moving hands the user can use it as a time display synchronization method mentioned herein. Additionally, the user can press or swipe on the watch display once the moving hands of the clock reach certain location on the watch or capture certain view image.

The display symbol can also be comprised of any scaled symbol of any kind or any other quantity measurement oriented symbol. For example, the user can use a display bar at a range of numbers of one to one thousand. By sliding finger on the on screen bar the user selects a desired number as an additional sequence step during the authentication. The bar can be of any kind, range number and accuracy as desired. Another symbol option can be any symbol with different portions of color and texture that the user can select as an additional sequence step in the registration and authentication.

The invention may make use of a hand written user symbol such as signature biometrics. During registration first step the user paints on the screen device 4-09 a registered symbol or signature as shown in 1401. Subsequently, during second step the person aligns auxiliary symbols or markers of any kind with the registered symbol or signature of step one 1401 display symbol. Still during the registration the user in the second phase using display box 1403 erases part of the signature. Auxiliary symbols comprise of any symbol aligned with registered symbol or signature, removing parts of the registered signature, distortion of any kind of the signature and any other symbol marking parts of the signature.

During verification the display can contain the auxiliary markers/hints of phase two of the registration 14023 display. The presented process allows high levels of signature biometrics authentication. The signature distortion of step two comprises of blurring, geometric distortion or any other image manipulation to disable said enrollment images reconstruction as in 1401.

Another possible implementation consists of the following steps: step one the user applies a signature or symbol on display 109 in the symbol box 1401. In step two, signature on display box symbol 1401 is displayed on screen 109 and the user applies arbitrary symbols, scrambled lines and any other symbols to conceal original signature as in symbol box display 1403. Upon authentication the user views the scrambled lines with the concealed signature in display symbol 1403. The user applies the signature or symbol by following the lines of the concealed signature or symbol of the registration phase one 1401. In this implementation an imposter will have hard time to differentiate the signature from the other concealing symbols of phase two of the registration 14023. The new level of authentication method sets a new hard to break within short limited time frame. The handwritten mark or symbol can be combined with any other form of user authentication.

During authentication the user is displayed with one or more randomly selected enrolment images in a consecutive manner with an unknown combination.

Additionally, the enrolled biometric method can consist of a set sequence of registered images or registered video as described herein. Upon authentication the user shall superimpose the object with the on screen registered video or registered image sequence of objects or symbols moving on screen as presented within the registration. For example upon registration the user can continuously superimpose selected moving line on screen with left edge of the driver license. Alternatively the user can superimpose the driver license with the moving line at specific synchronized locations of the line on screen.

In another example the user can define said set of symbols such as lines or symbols moving on screen. During registration two lines on screen are rotating at different directions and the user superimpose the object at specific synchronization and location of the lines on screen to one or more of the moving lines. Upon authentication the two lines are displayed on screen and the user shall follow the registered synchronized location, time with the object. Only the user knows the correct line alignment and synchronization between the line and the object viewed and would be authenticated as an authentic person.

The user could alternatively capture a view image and align or apply symbol in specific location and time on the view image as an additional sequence step of authentication method.

In another example of time display symbols, the display can contain a clock like display with moving hands the user can use it as a time display synchronization method mentioned herein. Additionally, the user can press or swipe on the watch display once the moving hands of the clock reach certain location on the watch or capture certain view image.

The display symbol can also be comprised of any scaled symbol of any kind or any other quantity measurement oriented symbol. For example the user can use a display bar at a range of numbers of one to one thousand. By sliding finger on the on screen bar the user selects a desired number as an additional sequence step during the authentication. The bar can be of any kind, range number and accuracy as desired. Another symbol option can be any symbol with different portions of color and texture that the user can select as an additional sequence step in the registration and authentication. When a user inserts a password using a keyboard, each keyboard press time is translated to a bar progress notification on the display. Alternatively, the user can press on a symbol between the password typing. For example, after typing three first letters of the password the user can press on a symbol with scale digits at a remembered location as it was during the registration. The time passed between typing the letters can also be shown at a notification bar or other type of progress symbol showing passed time.

Referring to FIG. 17, a computerized biometric method 1701 is disclosed. At step 1703, at least a portion of the previously stored enrolled image is presented to a candidate person. The previously stored enrolled image includes an enrolled password symbol having a timed sequence defined during enrollment. Further, the enrolled password symbol comprising at least one of symbol overlapped with at least one auxiliary symbol. In one embodiment, the symbol includes signature. Before presenting the enrolled password symbol, the enrolled password symbol is processed using image manipulation process. The image manipulation process is configured to reduce resolution by at least one of: image deletion, distortion, blurring, presenting plurality of said images on the display and a mathematical manipulation on image pixels. The image manipulation process disables an unauthorized reconstruction of an authentication image. At step 1705, the candidate person is instructed to apply at least a portion of a password symbol while following the timed sequence. At step 1707, the password symbol is aligned with the enrolled password symbol. At step 1709, the alignment of the password symbol applied by the candidate person is checked with the enrolled password symbol. At step 1711, on alignment, the password symbol applied by the candidate person is verified and the candidate person is authenticated as the user previously enrolled.

In another embodiment, the enrolled password symbol includes enrolled password and a timing sequence. The timing sequence includes different timing for pressing each password letter, and a time length of gap between each character. The timing sequence is synchronized with visual and audio indication of a measured length of time. In another embodiment, the computerized biometric method for enrollment and authentication is disclosed. The candidate person is instructed to input at least a portion of a password while following the enrolled timing sequence, while enabling alignment of the password and respective timing sequence with an enrolled password and respective enrolled timing sequence. The password applied or input the candidate person is verified, upon alignment of the alignment of the password and respective timing sequence with the enrolled password and respective enrolled timing sequence. Further, the candidate person is authenticated as the user previously enrolled.

Referring to FIG. 18, a computerized biometric method 1801 is disclosed. At step 1803, the candidate person is enabled to superimpose view object with at least one moving symbol or scales at specific synchronized locations on the display, or unsynchronized locations on the display for enrollment. The computerized biometric method 1801 enables the user to define the symbols such as lines moving on screen or display. At step 1805, one or more moving symbols are presented to the candidate person defined for authentication. At step 1807, the candidate person is instructed to follow enrolled location and time with the object and align the view object with the symbol at the enrolled location and time. At step 1809, the alignment is checked to determine if the view object is superimposed as similar to the enrollment of step 1803. At step 1811, upon alignment, the candidate person is authenticated as the user previously enrolled.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computer system. By way of example, and not limitation, such computer-readable media can comprise non-transitory physical storage media such as RAM, ROM, EPROM, flash disk, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "computer system" is defined as one or more software modules, one or more hardware modules, or combinations thereof, which work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a phone or Personal Digital Assistant "PDA") where internal modules (such as a memory and processor) work together to perform operations on electronic data. While any computer system may be mobile, the term "mobile computer system" especially includes laptop computers, notebook computers, cellular telephones, smart phones, wireless telephones, personal digital assistants, portable computers with touch sensitive screens and the like.

In this description and in the following claims, a "network" is defined as any architecture where two or more computer systems may exchange data. The term "network" may include wide area network, Internet local area network, Intranet, wireless networks such as "Wi-Fi™" virtual private networks, mobile access network using access point name (APN) and Internet. Exchanged data may be in the form of electrical signals that are meaningful to the two or more computer systems. When data is transferred or provided over a network or another communications connection (either hardwired, wireless, or a combination of hardwired or wireless) to a computer system or computer device, the connection is properly viewed as a transitory computer-readable medium. Thus, any such connection is properly termed a transitory computer-readable medium. Combinations of the above should also be included within the scope of transitory computer readable media and nontransitory computer-readable media. Computer-executable instructions comprise, for example, instructions and data which cause a general-purpose computer system or special-purpose computer system to perform a certain function or group of functions.

The term "server" as used herein refers to a computer system including a processor, data storage and a network adapter generally configured to provide a service over the computer network. A computer system which receives a service provided by the server may be known as a "client" computer system.

Although selected embodiments of the present invention have been shown and described, it is to be understood the present invention is not limited to the described embodiments. Instead, it is to be appreciated that changes may be made to these embodiments without departing from the principles of the invention, the scope of which is defined by the claims and the equivalents thereof.

What is claimed is:

1. A computerized biometric method, comprising:
enrollment and authentication of a user,
wherein the enrollment includes:
enabling a candidate person to create a first candidate signature,
aligning at least one auxiliary symbol over the first candidate signature to create a distorted signature, wherein the distorted signature comprises the first candidate signature and the at least one auxiliary symbol and conceals the first candidate signature within the distorted signature, and enrolling the distorted signature;

wherein the authentication includes:

presenting on a display at least a portion of a previously-enrolled distorted signature of the first candidate signature of the candidate person, instructing the candidate person to sign a second candidate signature over the previously-enrolled distorted signature by following lines of the first candidate signature concealed within the previously-enrolled distorted signature, aligning the second candidate signature with the first candidate signature concealed in the previously-enrolled distorted signature, and verifying the second candidate signature applied by the candidate person, upon alignment of the second candidate signature with the first candidate signature concealed in the previously-enrolled distorted signature, thereby authenticating the candidate person as the user previously enrolled.

2. The computerized biometric method of claim 1, wherein the distorted signature is created by at least one of removing part of the first candidate signature, blurring the first candidate signature, by geometric distortion of the first candidate signature, and by marking at least a part of the first candidate signature with the at least one auxiliary symbol.

3. The computerized biometric method of claim 1, wherein the at least one auxiliary symbol includes user hand written symbol, scrambled lines, scaled symbols, quantity measurement-oriented symbols, and symbols with different portions of color and texture.

4. The computerized biometric method of claim 1, wherein the first candidate signature includes user hand written symbols and marks.

5. The computerized biometric method of claim 1, wherein, during authentication, the candidate person is instructed to sign the second candidate signature in a predefined timeframe.

6. A computerized biometric method, comprising:

enrollment and authentication of a user, wherein the enrollment includes:

displaying a visual time display comprising at least one of a timer display and a progress bar to measure a time frame, and enabling a candidate person to input one or more characters at different time frames to create an enrolled password having an enrolled timing sequence, wherein the time frame is a time taken to type each character, and time taken to type adjacent characters of each character, wherein the time frame of each character of the enrolled password together defines the enrolled timing sequence;

wherein the authentication includes:

displaying the visual time display, instructing the candidate person to input a candidate password following a candidate timing sequence, and enabling alignment of the candidate password and the candidate timing sequence with the enrolled password and the enrolled timing sequence, and verifying the candidate password applied by the candidate person, upon alignment of the candidate password and the candidate timing sequence with the enrolled password and the enrolled timing sequence, thereby authenticating the candidate person as the user previously enrolled.

7. The computerized biometric method of claim 6, wherein the enrolled timing sequence is synchronized with visual and audio indication of a measured length of time.

8. The computerized biometric method of claim 6, wherein the enrolled password is entered by using a keyboard.

9. The computerized biometric method of claim 8, wherein each character entered by pressing on the keyboard translated to a bar progress notification on the display.

10. The computerized biometric method of claim 6, wherein the enrollment includes:

enabling the candidate person to capture a sequence of grid pictures, wherein each picture is aligned with on-screen grids or cells in any desired combination, wherein the authentication includes:

instructing the candidate person to aligns the on-screen grid symbols with the grid pictures as followed during enrollment, verifying the candidate person, if the candidate person follows alignment of the on-screen grid symbols with the grid pictures as followed during enrollment, thereby authenticating the candidate person as the user previously enrolled.

11. The computerized biometric method of claim 6, wherein the picture includes a card, a wall, a sign, a surface, and stationary and tangible movable objects.

12. The computerized biometric method of claim 6, wherein the sequence of pictures is synchronized with at least one of a timer and a display symbol measured on screen for enrollment and authentication.

13. The computerized biometric method of claim 6, wherein the candidate person is enabled to resize, reorder, move or write symbols in such a way that allows the candidate person to align the on-screen symbols with a viewed scene as similar to the enrollment.

14. A computerized biometric method, comprising:

enrollment and authentication of a user, wherein the enrollment includes:

presenting on a display one or more moving symbols to a candidate person and enabling the candidate person to superimpose one or more view images with at least one moving symbol or scales at specific synchronized locations on the display, or unsynchronized locations on the display, thereby defining an enrolled location and an enrolled time for the one or more view images with the at least one moving symbol or scales;

wherein the authentication includes:

presenting on a display one or more moving symbols to the candidate person defined during enrollment, instructing the candidate person to align a candidate view image with the moving symbol at the enrolled location and the enrolled time, and verifying the candidate person as an authentic person, upon alignment of the candidate view image with the moving symbol at the enrolled location and the enrolled time, thereby authenticating the candidate person as the user previously enrolled.

15. The computerized biometric method of claim 14, wherein the candidate person is enabled to define moving symbols during enrollment.

16. The computerized biometric method of claim 15, wherein the moving symbols includes lines, marks and quantity measurement-oriented symbols.

17. The computerized biometric method of claim 14, wherein the display comprises a clock type display with moving hands for time display synchronization.

18. The computerized biometric method of claim 17, wherein the candidate person is enabled to press or swipe on the clock type display once the moving hands of the clock reach certain location on the clock type display or capture certain view image.

19. The computerized biometric method of claim 14, wherein the candidate person is enabled to superimpose view image with on-screen video and image sequence for enrollment and authentication.

20. The computerized biometric method of claim 14, wherein the candidate person is enabled to capture the view image and align or apply symbol in specific location and time on the view image as an additional sequence step of enrollment and authentication method.

* * * * *